United States Patent
Hansen, II et al.

(10) Patent No.: US 7,421,066 B1
(45) Date of Patent: *Sep. 2, 2008

(54) TELEPHONE CALL/VOICE PROCESSING SYSTEM

(75) Inventors: Harold E. A. Hansen, II, Plano, TX (US); Eric G. Suder, Plano, TX (US)

(73) Assignee: Estech Systems, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/805,395

(22) Filed: Mar. 13, 2001

Related U.S. Application Data

(63) Continuation of application No. 08/873,215, filed on Jun. 11, 1997, now Pat. No. 6,252,944.

(60) Provisional application No. 60/023,749, filed on Jun. 12, 1996.

(51) Int. Cl.
*H04M 1/64* (2006.01)

(52) U.S. Cl. .................... 379/88.07; 379/88.22

(58) Field of Classification Search ........... 379/156, 379/157, 88.18, 90.01, 90.02, 93.01, 93.09, 379/93.23, 114.29, 121.01, 142.01, 177, 379/242, 243, 244, 250, 251, 253, 254, 257, 379/258, 308, 211, 67.1, 88.07, 88.22, 88.25, 379/201, 374, 159, 88.11, 100.15, 373.04, 379/88.27; 455/445, 417, 422.1, 553.1, 373.04, 455/557; 370/386; 704/200
See application file for complete search history.

(56) References Cited

U.S. PATENT DOCUMENTS

| | | | | |
|---|---|---|---|---|
| 4,360,809 A | | 11/1982 | Bourgonje ............. | 340/825.86 |
| 4,554,413 A | * | 11/1985 | Pinede et al. ............... | 379/165 |
| 5,060,192 A | | 10/1991 | Young et al. ................ | 365/156 |
| 5,091,932 A | * | 2/1992 | Tsuda .................... | 379/100.15 |
| 5,274,738 A | * | 12/1993 | Daly et al. ................... | 704/200 |
| 5,355,406 A | * | 10/1994 | Chencinski et al. ...... | 379/88.27 |
| 5,452,289 A | * | 9/1995 | Sharma et al. .............. | 370/286 |
| 5,526,397 A | * | 6/1996 | Lohman ..................... | 455/560 |
| 5,544,231 A | * | 8/1996 | Cho ......................... | 379/88.24 |
| 5,790,957 A | * | 8/1998 | Heidari .................... | 455/553.1 |
| 5,815,552 A | * | 9/1998 | Ohtsuka .................. | 379/88.11 |
| 5,953,656 A | * | 9/1999 | Bertocci .................. | 455/412.2 |
| 5,960,348 A | * | 9/1999 | Eisdorfer et al. ............ | 455/445 |
| 5,991,369 A | * | 11/1999 | Petrunka et al. .......... | 379/88.25 |
| 5,991,397 A | * | 11/1999 | Han ...................... | 379/373.04 |
| 6,011,579 A | * | 1/2000 | Newlin .................... | 348/14.08 |
| 6,028,925 A | * | 2/2000 | Van Berkum et al. .. | 379/265.01 |
| 6,393,275 B1 | * | 5/2002 | Alfred .................... | 455/422.1 |
| 6,597,924 B1 | * | 7/2003 | Smith ......................... | 455/557 |

* cited by examiner

*Primary Examiner*—Gerald Gauthier
(74) *Attorney, Agent, or Firm*—Fish & Richardson P.C.; Kelly K. Kordzik

(57) ABSTRACT

A telephone and voice mail (voice processing) system is implemented using only a single processing means for controlling operations of both the telephone system and the voice mail system. The single processing means communicates with a hard disk, which stores programs for running the various operations of the system, voice prompts and all voice mail messages. The single processing means is coupled to signal processing circuitry, which emulates analog electronics that would be used for filters, tone decoder, generators, etc. The single processing means and signal processing circuitry are coupled to central office lines and station lines by a digital cross-point matrix, which can connect any voice path to another voice path. The system integrates call processing and voice processing into one system controlled by one set of software and a single processing means.

34 Claims, 18 Drawing Sheets

TELEPHONE CALL/VOICE PROCESSING SYSTEM

CROSS-REFERENCE TO RELATED APPLICATION

This is a continuation of application Ser. No. 08/873,215 filed Jun. 11, 1997, issued as U.S. Pat. No. 6,252,944, which claims priority to U.S. Provisional Application Ser. No. 60/023,749, filed Jun. 12, 1996.

TECHNICAL FIELD

The present invention relates in general to telephone and voice processing systems, and in particular, to a telephone call/voice processing system operable and controlled by one set of software.

BACKGROUND INFORMATION

There is a growing trend of individuals leaving large companies and forming their own enterprises with a handful of employees. Upon doing so, one of the first things these people realize is that they miss the tools they were accustomed to using within their former larger company. One of these primary tools is a small PBX (Private Branch Exchange) system or key system for interconnecting a number of local telephone sets to a fewer number of central office ("CO") lines from the local telephone company or a private telecommunications network. Another tool often missed is some type of voice mail system (note, "voice mail system" and "voice processing system" are used interchangeably herein).

The problem for such companies is obtaining a telephone system and a voice mail system that work well together, since typically such systems are manufactured by different companies. The industry is currently separated into two markets, one of those being the voice mail or voice processing market and the other one being the telephone system, or PBX, market. The result is that separate telephone and voice mail systems must be purchased and interconnected to operate correctly and efficiently.

Referring to FIGS. 2 and 13, there is illustrated a prior art technique for combining telephone and voice mail systems. The dilemma is how to provide communication between the telephone system (PBX) 200 and the voice mail ("VM") system 201. Communication with the telephone system 200 is typically done through either the CO lines or on the station side. Since CO lines are more of a precious resource than the station connections, the prior art system shown in FIG. 2 communicates between the voice mail system 201 and the telephone system 200 on the station side using connection 202. Connection 202 may be an analog telephone line or via an EKT (electronic key telephone) integrated connection. Alternatively, a proprietary EKT line 204 may be coupled to an analog telephone adapter 205, which uses analog line 203 to couple to voice mail system 201.

Such systems are typically configured by programming the telephone system 200 to perform a transfer to ring a group of extensions that are connected to the voice mail system 201 upon one or more occurrences, such as when the outside call into the telephone system 200 to a particular extension receives a busy signal or the extension rings a certain number of times. At this point in time the telephone call resides within telephone system 200 (step 1301). Next, the telephone system 200 performs the same physical functions as an operator by transferring the call using a flash-hook and then dialing the extension number (step 1302) pertaining to the voice mail system 201 in order to transfer a call to the voice mail system 201. At this point in time, the telephone call now resides within the voice mail system 201, which may play a greeting to the incoming call (step 1303). In response to the greeting played by the voice mail system 201, the caller may dial digits, which are detected by the voice mail system 201 (step 1304). Thereafter, the voice mail system may record a message spoken by the caller (the incoming call resides in the voice mail system 201; step 1306), or the voice mail system 201 may transfer the call to a desired destination, such as a station extension (the incoming call is now resident within the telephone system 200; step 1305). In-band signalling, a serial connection, etc. may be added to further improve the system, but it is still configured as two separate systems—a telephone system 200 coupled to a separate voice mail system 201.

Another prior art system not shown herein is the use of a personal computer with a voice adapter card inserted therein for interconnecting to a telephone system. Again, the same problems arise, since there is a separate voice mail system coupled to a telephone system where software in the personal computer operates the voice mail portion.

Thus, there is a need in the art for an integrated system providing both telephone and voice mail capabilities.

SUMMARY OF THE INVENTION

The foregoing need is addressed by the present invention, which is a telephone and voice mail system requiring only a single processing means for controlling operations of both the telephone system and the voice mail system. The single processing means communicates with a hard disk, which stores programs for ruining the various operations of this system, voice prompts and all voice mail messages. The single processing means is coupled to a signal processing circuitry, which emulates analog electronics that would be used for filters, tone decoder, and generators, etc. The single processing means and signal processing circuitry are coupled to CO lines and station lines by a digital cross-point matrix, which can connect any voice path (also referred to herein as a "call") to another voice path.

The system comprised of the single processing means, signal processing circuitry, and digital cross-point matrix is a fully digital architecture.

A single processing means is defined herein as one or more microprocessors and/or microcontrollers that are controlled by a single set of software. Essentially, a single microprocessor could be utilized to operate the present invention, but the present invention should not be limited to such a single microprocessor structure, since a plurality of microprocessors and/or microcontrollers could be substituted to perform various portions of the software code. Alternatively, it could be said that the present invention is under a single control mechanism, which may comprise one or more microprocessors and/or microcontrollers implementing a single set of software codes.

The signal processing means may be a digital signal processor ("DSP"), or any other equivalent mechanism.

The system also includes a modem so that the system can be accessed remotely for providing it with new programs and voice prompts.

Furthermore, the digital cross-point matrix provides connections to one or more analog ports for connecting to standard analog-type connections, such as cordless telephones, fax machines, etc. There is also a provision for providing hold music through the digital cross-point matrix.

One advantage of the present invention is that it integrates call processing and voice processing into one system controlled by one set of software.

Another advantage of the present invention is that it allows for the provision of a voice message to a caller that an extension is busy as opposed to the caller hearing a busy signal.

Yet another advantage of the present invention is that it provides voice resources to the voice processing module of the system.

Yet still another advantage of the present invention is that the processing of incoming calls is done in an integrated fashion so that callers are not transferred back and forth from the telephone system and the voice mail system, with each performing its operation only during the time that it is connected to the caller.

And yet still another advantage of the present invention is that hook flash and other call progress monitoring is not required.

Yet another advantage of the present invention is that a station user is provided with voice prompted Help providing interactive voice explanations of user programming requirements and all commonly used phone features.

Another advantage of the present invention is that it provides for one-keystroke immediate interface to the user's voice mail features.

And, another advantage of the present invention is that it provides a user the capability of having a conversation recorded and stored for later retrieval, wherein this recording can then be handled as any type of regular message, where it can be forwarded to other users within the system.

A further advantage of the present invention is that the system is programmable to provide either the traditional ring back for no answer, busy, etc. signals, or voice prompts instead of such tone signals.

Yet another advantage of the present invention is that it provides for real time call screening of incoming calls giving the user the option of intercepting the call or allowing the message to be completed to the user's mailbox.

And, yet still a further advantage of the present invention is that it enables a user to create and/or forward a voice mail message to a plurality of extensions coupled to the system.

An additional advantage of the present invention is that the system will embed with each message or recording the phone number for the caller based on the digits dialed if the call is initiated by a user, or on Caller ID if it is an incoming call.

Yet another additional advantage of the present invention is that it allows for a caller while being provided a message on hold to dial other options such as the operator or make menu selections.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION

Figure 1:
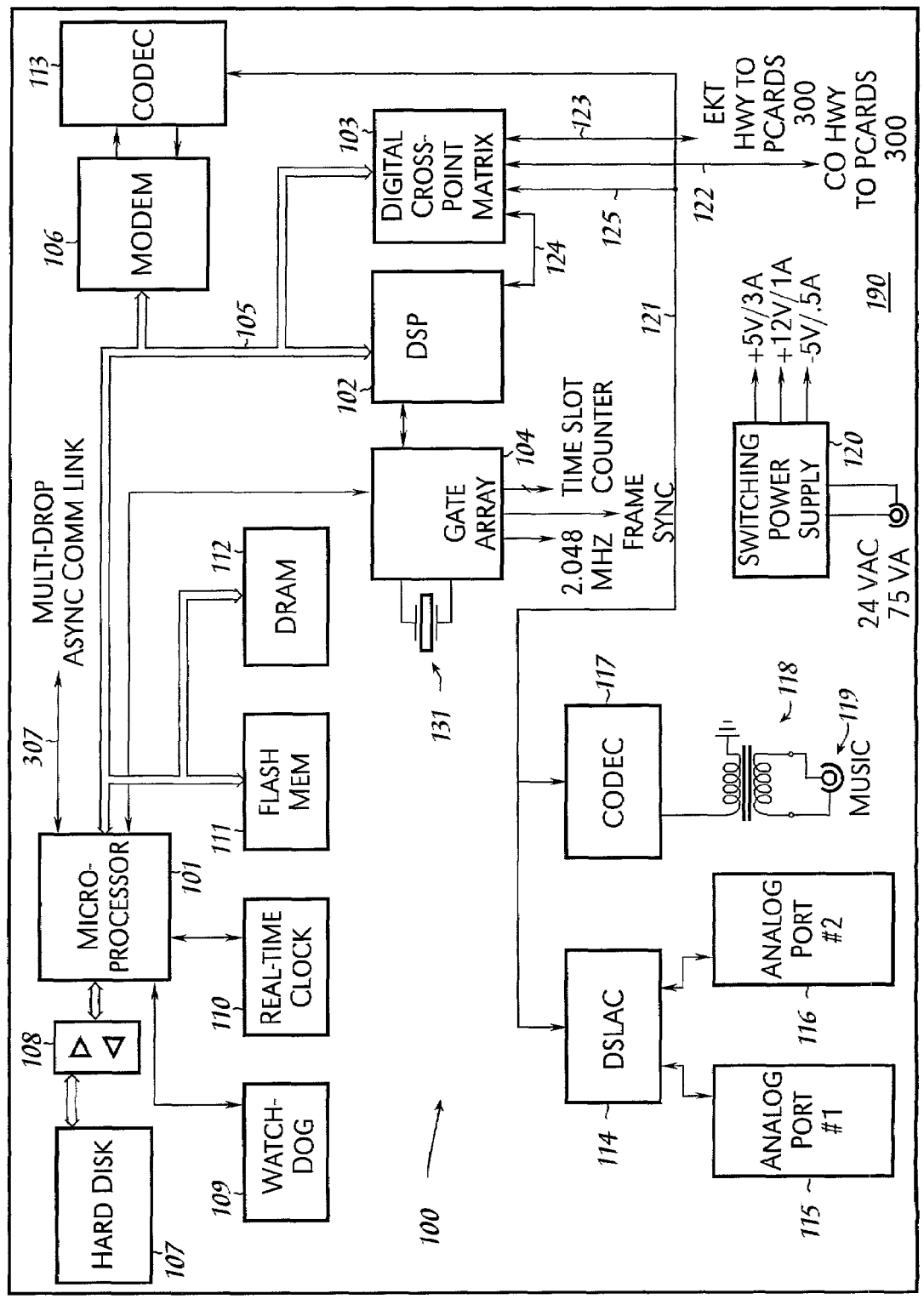
FIG. 1 illustrates, in block diagram form, components of the present invention.
Figure 2:
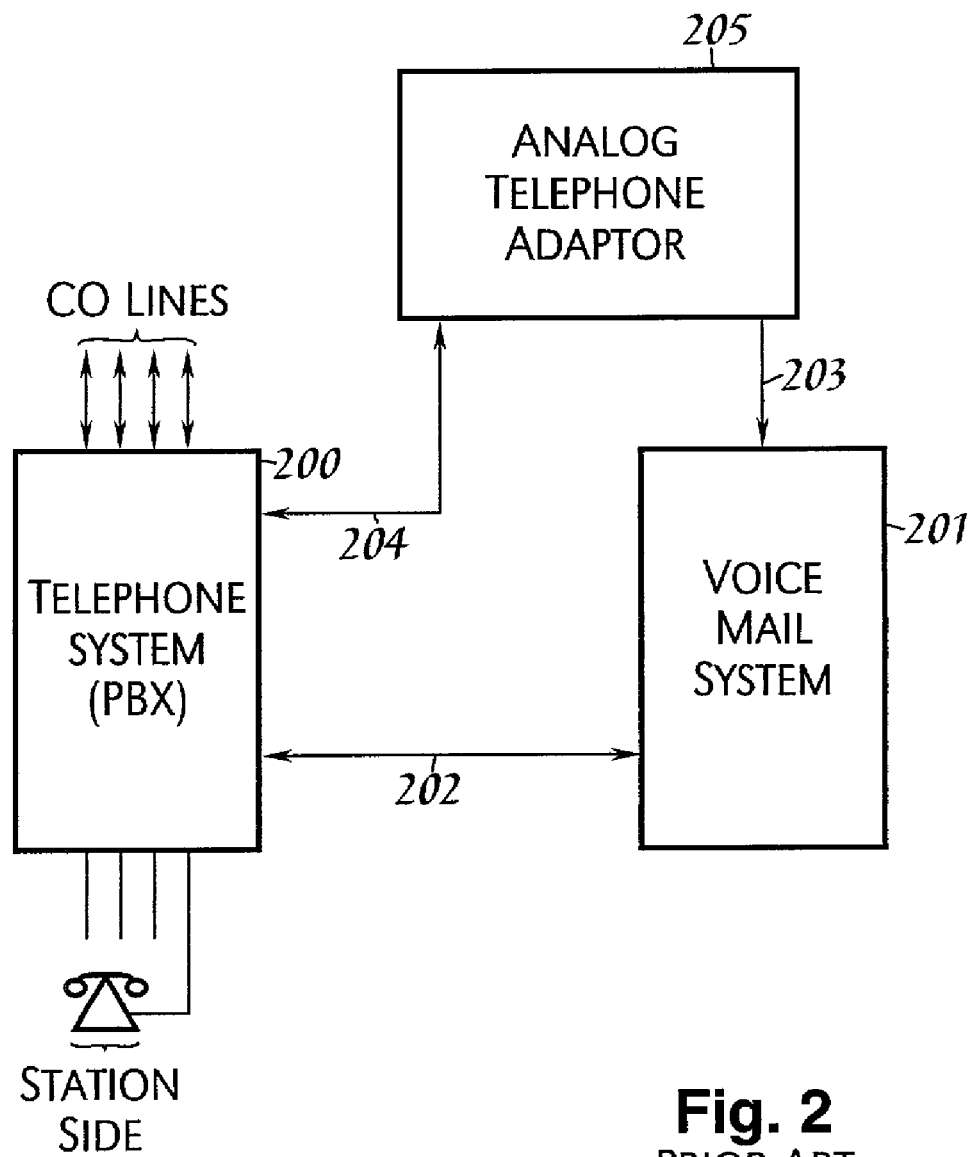
FIG. 2 illustrates a prior art system coupling a telephone system and a voice mail system.

In the following description, numerous technical details are set forth such as specific word length and specific hardware interfaces, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring to FIG. 1, there is illustrated, in block diagram form, system 100 for integrating call processing and voice processing using a single processing means, which in this example is one microprocessor 101. Microprocessor 101, which may be a Motorola 68000 class microprocessor, communicates with hard disk 107 using driver circuitry 108. Hard disk 107 stores program data, voice prompts, voice mail messages, and all other types of speech used within system 100.

Microprocessor 101 also includes watchdog timer 109 and real-time clock source 110.

Microprocessor 101 is coupled via bus 105 to flash memory 111 and dynamic random access memory ("DRAM") 112. Flash memory 111 is used to store bootstrap data for use during power up of system 100. DRAM 112 stores the program accessed by microprocessor 101 during operation of system 100.

Bus 105 also couples microprocessor 101 to signal processing circuitry, which in this example is digital signal processor ("DSP") 102. Digital signal processor ("DSP") 102 implements a number of functions traditionally implemented by discrete analog components.

Figure 10:
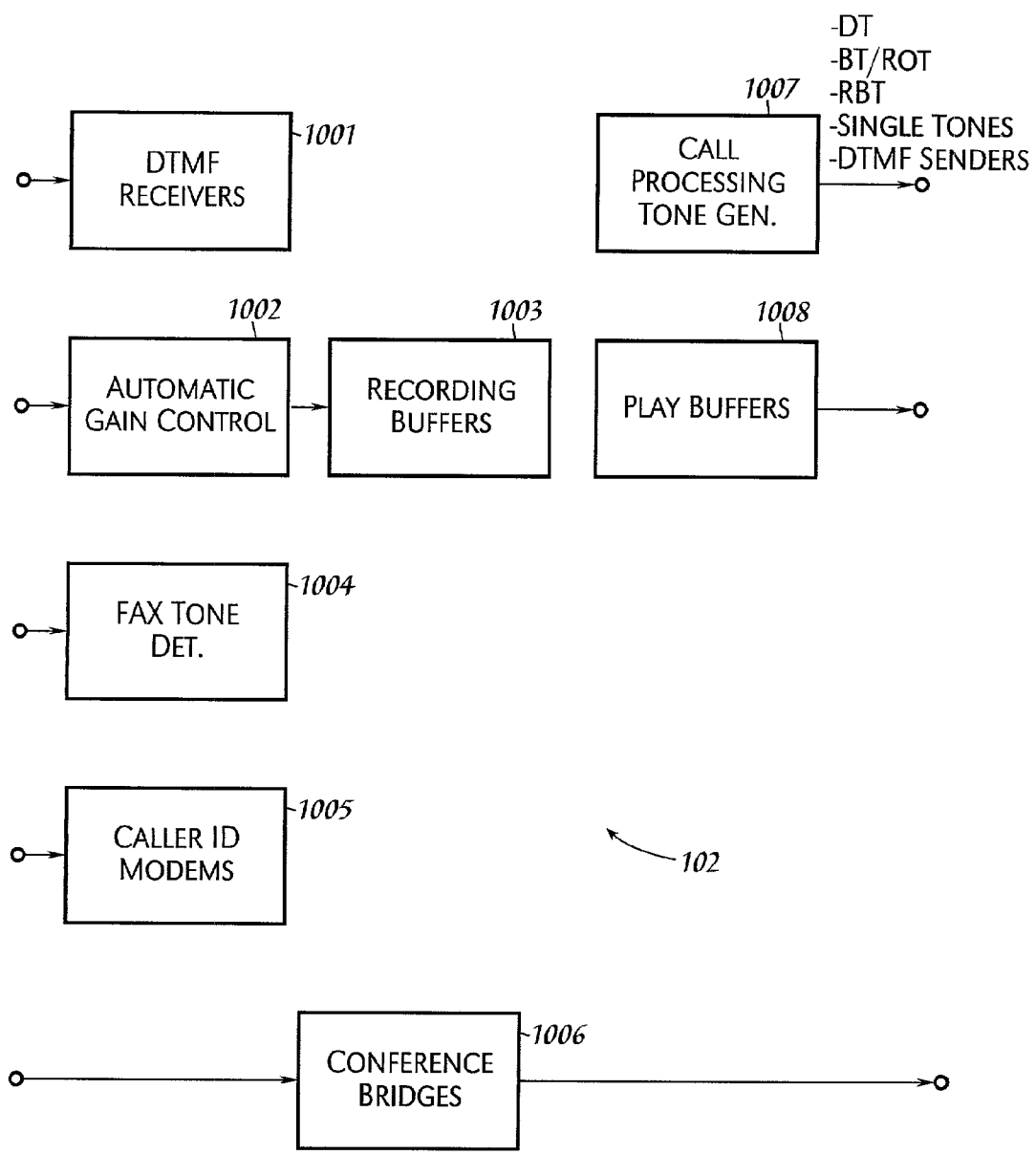
FIG. 10 illustrates functions implemented within a signal processing circuit within the present invention.

Referring next to FIG. 10, there are illustrated some of the primary functions implemented in DSP 102. DTMF receivers 1001 are implemented using frequency domain filtering techniques. DTMF receivers 1001 detect all 16 standard DTMF (touch-tone) digits.

Automatic gain control ("AGC") 1002 is a closed-loop gain control system which normalizes received audio levels during recording.

Recording buffers 1003, which are coupled to AGC 1002, receive and store speech samples after they have passed through AGC block 1002. These speech samples are converted to μ-law PCM (Pulse Code Modulation) and double buffered (several samples per buffer). Microprocessor 101 copies the record data out of DSP buffers 1003 into RAM buffers (not shown), which are located in the microprocessor 101 data RAM area.

Fax tone detector 1004 is implemented using frequency domain filtering techniques. Fax tone detector 1004 detects the standard 1100 Hz FAX CNG tone (also referred to as the Calling Tone).

Caller ID modems 1005 are 1200 baud FSK modems similar to Bell 202-type modems. Caller ID modems 1005 are implemented as a frequency discriminator where a time delayed (quadrature) signal is multiplied by the original signal, low pass filtered, then sliced, which produce the square wave caller ID data stream.

Call processing tone generators 1007 are free running oscillators which generate the appropriate tones (and tone pairs) which make up the industry standard call processing tones. These tones include:
dial tone
busy/reorder tone
ring back tone
single frequency (440 Hz) tone
DTMF dialer tones Play buffers 1008 replay data from hard disk 107 through microprocessor 101 and place this play data in buffers 1008. This data is converted from an 8-bit C-law PCM signal to 14-bit linear data.

Conference bridges 1006 allow multiple conference bridges to mix together conferees into a multi-party conference. These conferees may be a mixture of inside and outside parties. A combination of "loudest speaker" and "summing" is utilized.

DSP 102 communicates with microprocessor 101 via a host interface port ("HIP") via bus 105. The HIP link supports a command-based protocol, which is used to directly read or write DSP memory locations. DSP 102 is a RAM-based part and has its program downloaded from microprocessor 101. Once downloaded and running, microprocessor 101 (the host) polls for events or receives interrupts indicating that data is available. DSP 102 speech connections are made over an industry standard 32-time slot, 2.048 megabits per second (Mb/s) digital serial link 124. Link 124 occupies one of the digital highways implemented by digital cross-point matrix 103. Each service of DSP 102 occupies a single time slot. For example, DTMF receiver 1 occupies time slot 0 while conference bridge circuit 12 occupies time slot 31.

Digital cross-point matrix 103 is also coupled to bus 105 and operates to connect any voice path to any other voice path. Digital cross-point matrix 103 is a VLSI (Very Large Scale Integration) integrated circuit. An example of digital cross-point matrix 103 is manufactured by MITEL Semiconductor Corporation as part No. 8980. Digital cross-point matrix 103 communicates with microprocessor 101 via a memory mapped input/output (I/O) scheme. A command/control protocol is used for communication between microprocessor 101 and digital cross-point matrix 103 via bus 105. Cross-point matrix 103 is coupled by highway 124 to DSP 102. Cross-point matrix 103 is coupled by connection 125 to highway 121. Cross-point matrix 103, is also coupled to peripheral cards by highways 122 and 123. The peripheral cards are described in further detail below with respect to FIG. 3.

Connections 121-125 are referred to as "highways", which are transmission links using time-division multiplexing ("TDM") as a means for transmitting and receiving data.

Digital cross-point matrix 103 is capable of making 256 simultaneous fully non-blocking connections within system 100. However, system 100 may be upgraded by adding additional DSPs and/or cross-point matrices.

Cross-point matrix 103 makes connections using the TDM highway by receiving instructions from microprocessor 101 to interconnect channels within the frames of the TDM bit stream. This results in the non-blocking capability of cross-point matrix 103, and also allows for a single voice resource, caller, or voice message to be simultaneously coupled to multiple other voice resources, station or CO originated callers, and/or voice messages.

Gate array 104 is an SRAM (Static Random Access Memory) based device. An example of gate array 104 is manufactured by XILINX. Gate array 104 is responsible for generating all system timing. A master clock signal is provided by microprocessor 101 at 16.384 MHz. This clock signal is divided down to provide a number of phase coherent system clocks such as 4.096 MHz, 2.048 MHz and 8 KHz (frame sync). In addition, a 5-bit time slot counter is implemented which allows all the system CODECs to detect the appropriate time slot to use (0-31). An additional divider chain is included to divide the system clock down to 20 Hz, which is used by the ringing generator power supply (not shown).

Gate array 104 is downloaded at boot-up by system software. Gate array 104 is based on an SRAM architecture. That is, the internal fusible links commonly found in programmable logic are actually stored in volatile SRAM. Because of this architecture, gate array 104 is downloaded after power-up. Also, note the added flexibility of being able to modify the logic by simply loading new system software. Because the device is SRAM-based, it loses its programming when power is removed.

Bus 105 is also coupled to modem 106, which provides a capability of calling into system 100 on a remote basis to load additional programs, voice prompts, etc., or updates thereto, into hard disk 107. Modem 106 is coupled to coder/decoder ("CODEC") 113, which is coupled to highway 121. This connection allows coupling of modem 106 through cross-point matrix 103 to CO lines through highway 122 and the p-card described below with respect to FIG. 3.

Also coupled to highway 121 is dual subscriber line access chip 114, which is well-known in the art, and which is coupled to analog ports 115 and 116, which provide an ability for system 100 to communicate to analog-type connections such as cordless telephones and fax machines.

Highway 121 is also coupled to CODEC 117, which is coupled to transformer 118 to a music source 119, which provides an ability to couple an external music source to a caller through cross-point matrix 103 for such things as providing the caller with music on hold.

Power to system 100 is provided through switching power supply 120, which converts AC to the various DC supply voltages needed by circuitry within system 100.

Figure 3:
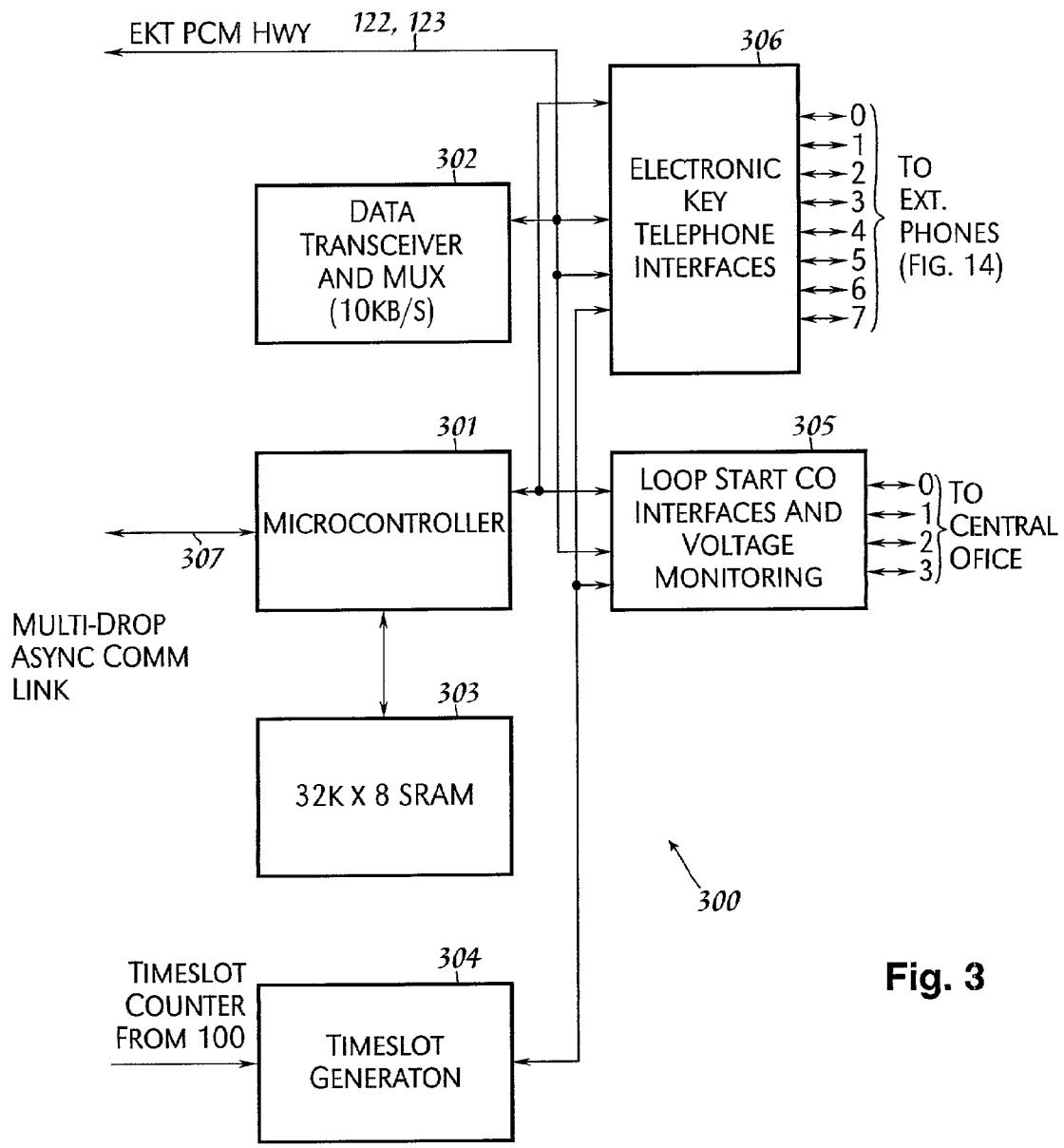
FIG. 3 illustrates, in block diagram form, components of a port card implemented within the present invention.

Referring next to FIG. 3, there is illustrated peripheral-card ("p-card") 300, which is coupled to main board 190 of system 100. Main board 190 communicates with p-card 300 via a multi-drop async serial link 307. This connection 307 is made directly to microprocessor 101 (via buffers not shown).

P-card 300 provides interconnections between CO lines and extension lines to system 100.

Microcontroller 301 is an 8-bit microcontroller, an example of which is manufactured by Hitachi as Part No. H8, which controls all the real-time functions associated with p-card 300. Microcontroller 301 is responsible for all low-level communication with the EKTs 1400 (electronic key telephones) (see FIG. 14) and CO lines. A low level event is an event which is specific to the hardware and is required to be handled in real-time. These events are unique to the EKT or CO trunk protocol. In contrast, high level events can be abstracted to have no correlation to actual hardware. An example of a high level event might be "Turn the SPKR LED On." The corresponding low-level event would be "Send HEX Code 21 to EKT Address 4." This level of abstraction helps stabilize the complex system software. Another example would be that system software can send a command to seize a CO trunk without being concerned with the low-level differences between a ground start or DID trunk. Some of the low-level tasks include updating EKT LEDs and LCD displays, decoding key press messages from the EKTs 1400, scanning the CO status bits and filtering RING and CO seizure events.

Microcontroller 301 converts these low-level real-time events to high-level events which form a protocol referred to as the ESi Command Language (ECL). This ECL protocol is implemented on multi-drop async serial channel 307 between main board 190 and all p-cards 300 in system 100. Microcontroller 301 contains 2 async serial ports. One of these serial ports is connected to main board 190, and the other port drives data transceiver and multiplexer 302.

When p-card 300 is plugged into main board 190 (via ribbon cable (not shown)) a card address is assigned to p-card 300. This card address is read by microcontroller 301 and is used to filter commands over communication link 307. When main board 190 software wants to communicate with the specific p-card 300, the address is sent in the message packet which all p-cards 300 receive. P-cards 300 match the address in the message to the hard wired address on the ribbon cable. If a match is made, only that p-card 300 responds to the command set.

Microcontroller 301 contains an internal program memory (not shown) and is connected to an external SRAM 303. The internal program memory contains a bootstrap program which upon reset or power-up, requests a fresh firmware load from main board 190. This firmware load is transferred to SRAM 303. Upon download completion, the program is run from within SRAM 303. This scheme allows for microcontroller 301 firmware to be updated and loaded at any time.

Main board 190 sources all system timing through block 304. Timing signals to p-card 300 consists of a 2.048 MHz clock signal, an 8 KHz frame sync, which signifies the first time slot of a 32 time slot highway, and 5 time slot counter bits, which represent a binary count from 0 to 31.

As mentioned above, p-card 300 is assigned a card slot address when it is connected to main board 190. This card slot address is used to calculate which time slots p-card 300 should be using. The time slots used for the CO CODECs 1204 (see FIG. 12) are actually generated by the time slot assignment circuitry contained in the DSLAC chip. There are two separate 2.048 MHz (32 time slot) highways 122 and 123 that run between main board 190 and p-card 300. One (123) is for the EKTs 1400 and the other (122) is for the COs.

Figure 11:
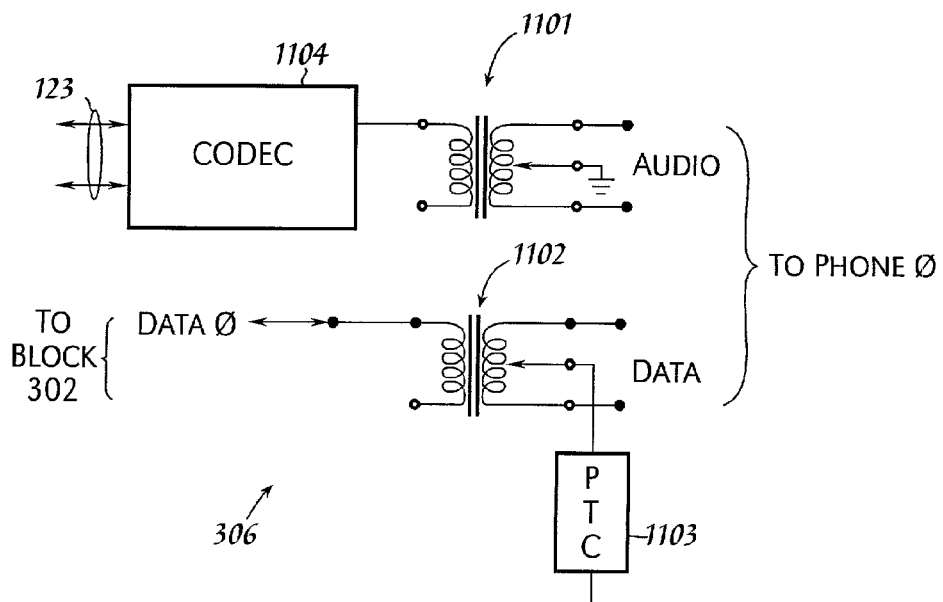
FIG. 11 illustrates an electronic key telephone interface.

Referring to FIGS. 3 and 11, EKT interface 306 describes the connection between system 100 and electronic key telephone (EKT) 1400. This interface consists of two physical pairs of wires running between system 100 (often referred to as a, Key System Unit (KSU)) and EKT 1400. One of these pairs supports an analog bi-directional audio path and the other supports a bi-directional digital control channel.

EKT 1400 is connected to the KSU via transformers 1101 and 1102, providing a high degree of isolation as well as longitudinal balance. Transformer 1101 is for the audio path and transformer 1102 is for the data path on each end of the connection. Power is supplied to EKT 1400 by phantoming the power through the center taps of transformers 1101 and 1102. The KSU supplies a nominal voltage of 36 volts DC which passes through a positive temperature co-efficient varistor ("PTC") 1103. PTC 1103 acts as a resettable fuse which becomes very resistive during excessive current flow (such as when a short in the station wiring occurs). EKT 1400 regulates down to +12 and +5 volts.

The audio path is a dry analog bi-directional path consisting of a traditional hybrid (2:4 wire converters) on each end. The audio path on p-card 300 is converted to a 4-wire path by the hybrid circuit in interface 306. The separate transmit and receive paths are gain adjusted and connected to CODEC 1104. CODEC 1104 converts the analog signals to digital and presents these voice signals to EKT highway 123. EKT highway 123 consists of a 2.048 Mb/s serial stream which is divided into 32 64 Kb/s time slots. Each CODEC 1104 occupies one time slot on highway 123. System 100 reserves two time slots per EKT 1400 for future migration to a fully digital 2B+D EKT where two 64 Kb/s digital channels are available to each station instrument.

Timing for CODECs 1104 is supplied by time slot generation block 304, which is coupled to the time slot counter output from system timing block 104 (see FIG. 1).

The EKT data is produced by a UART (Universal Asynchronous Receiver/Transmitter) in microcontroller 301. This NRZ transmit and receive data is presented to data transceiver and multiplexer 302. A single data transceiver is used for all 8 EKT circuits and is multiplexed through an 8-channel analog mux to each EKT data transformer 1102 in a round-robin fashion.

Messages to EKT 1400 consist of commands such as POLL, TURN_ON_LED, WRITE_LCD_CHARACTER, RING PHONE, etc. Response messages from EKT 1400 consists of a lower level key command in the first 5 bits and a single hook switch bit in the 8th bit. If the 7th bit of the response message is set, a high level response command such as FIRMWARE_VERSION or TERMINAL_TYPE is present in the first 5 bits.

Figure 12:
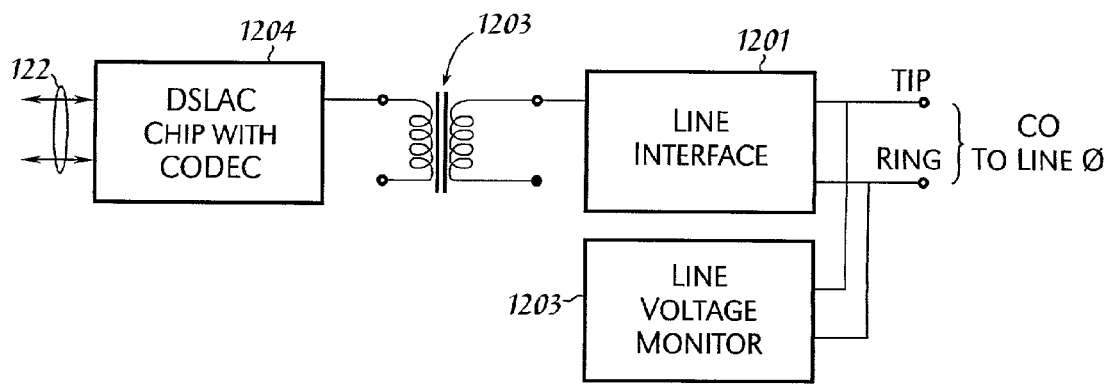
FIG. 12 illustrates a loop start CO interface.
Figure 13:
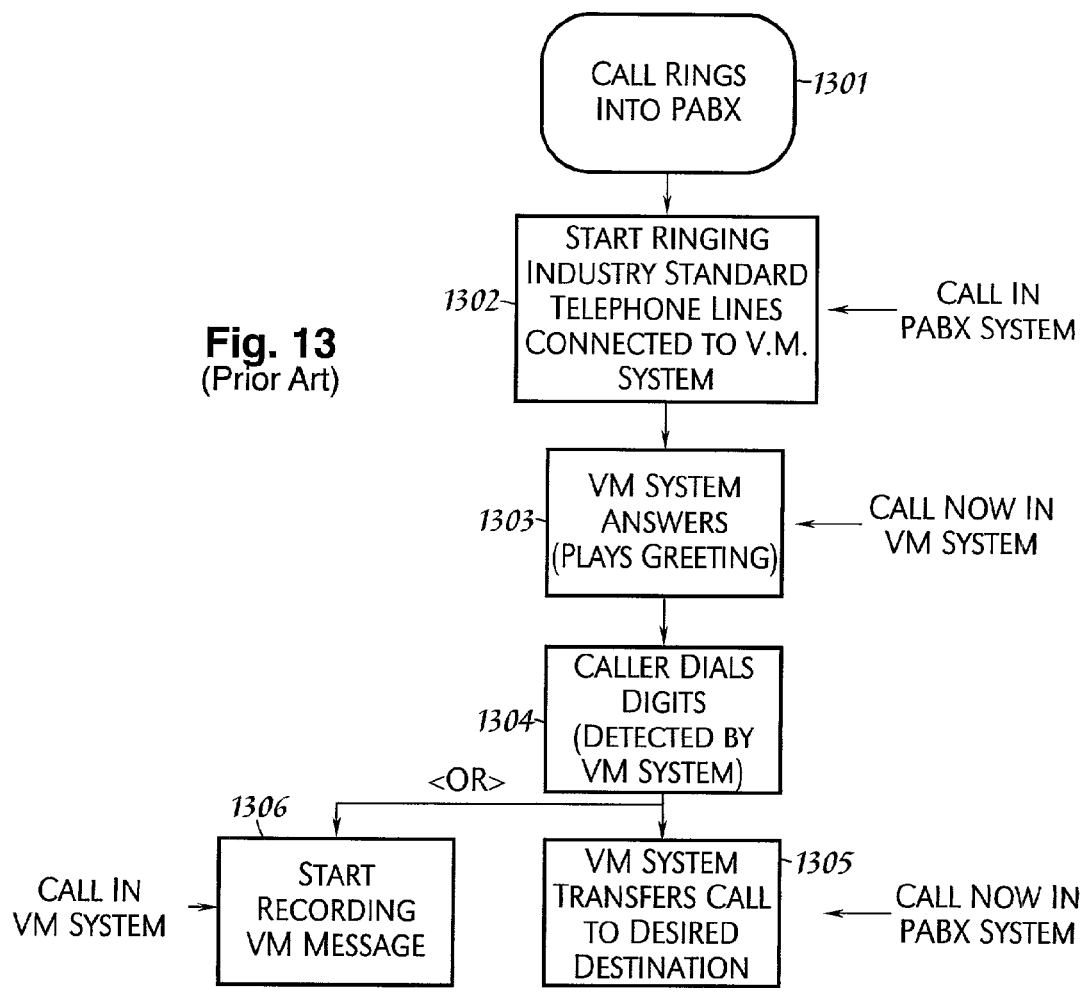
FIG. 13 illustrates a prior art process for call processing.

Referring next to FIGS. 3 and 12, the loop start central office (CO) lines are supplied by the local telephone company and consist of a wet balanced differential audio pair. The term "wet" refers to the fact that a voltage of −48 volts is present on the pair. System 100 requests dial tone from the CO by providing a nominal 200 ohm loop across the TIP and RING conductors and releases the connection by opening the loop.

The CO rings system 100 by placing a 90 vrms AC, 20 Hz sine wave on the TIP and RING conductors. System 100 seizes the line by going off hook.

P-card 300 incorporates a unique circuit which monitors the voltage present across TIP and RING of each CO. This line voltage monitor circuit 1202 serves to detect the ring voltage present during ringing (ring detection) and the unique feature of monitoring the CO line status for conditions such as whether the CO is plugged in or if someone is off hook in front of system 100. The latter can be used to detect theft of service or allow a credit card verification terminal to be used without interfering with normal system operation.

Voltage monitor 1202 consists of a balanced differential op-amp connected across TIP and RING of the CO lines through a very high impedance (>10 M ohms). The output of the four voltage monitor op-amps are fed to an analog-to-digital converter with a built-in analog multiplexer (not shown). Microcontroller 301 firmware monitors the line voltages.

There is also a balanced differential AC coupled op amp across the CO TIP and RING to monitor the low level audio tones present during caller ID. The output of these op-amps are selected via an analog switch during the idle period and are connected to the CO line CODEC 1204.

To correctly terminate the CO line (seizure) care must be taken to satisfy the DC loop requirements (~200 ohms) and the AC impedance requirements (~600 ohms). The classic approach has been to terminate TIP and RING with an inductor (called a holding coil) which has a large inductance (>1 Hy) and a DC resistance of ~200 ohms. The inductor separates the AC and DC components to give the desired effect. The problem is that the inductor must be large enough not to saturate with currents as high as 100 milliamps. An inductor which satisfies these requirements is physically cumbersome.

P-card 300 incorporates a solid state inductor circuit called a gyrator (not shown) to implement the holding coil function. This single transistor emulates an inductor with the above requirements while taking up very little PCB space.

A small solid state relay (not shown) is used as the hook switch. When energized, the gyrator holding coil is placed across TIP and RING closing the loop. The audio present on TIP and RING is AC coupled to a small dry transformer 1203. The secondary of this transformer 1203 is connected to the AC termination impedance and to the CODEC 1204, which is implemented on a dual subscriber line access chip ("DSLAC").

High voltage protection is provided for all paths on the TIP and RING connections. These paths include TIP to RING, TIP to GROUND, RING to GROUND, and TIP and RING to GROUND. This high voltage protection is accomplished by first passing the TIP and RING conductors through positive temperature coefficient varistors (not shown). These varistors act as resettable fuses. When excessive current flows through these varistors, they become resistive thus limiting the current flow. When the excessive current is stopped, the original resistance is restored.

DSLAC 1204 consists of two identical circuits which contain the CODEC, DSP-based echo canceller, gain control and time slot assignment circuit. DSLAC 1204 is controlled by microcontroller 301 to set parameters such as echo canceler coefficients, gain coefficients and time slots.

Figure 15:
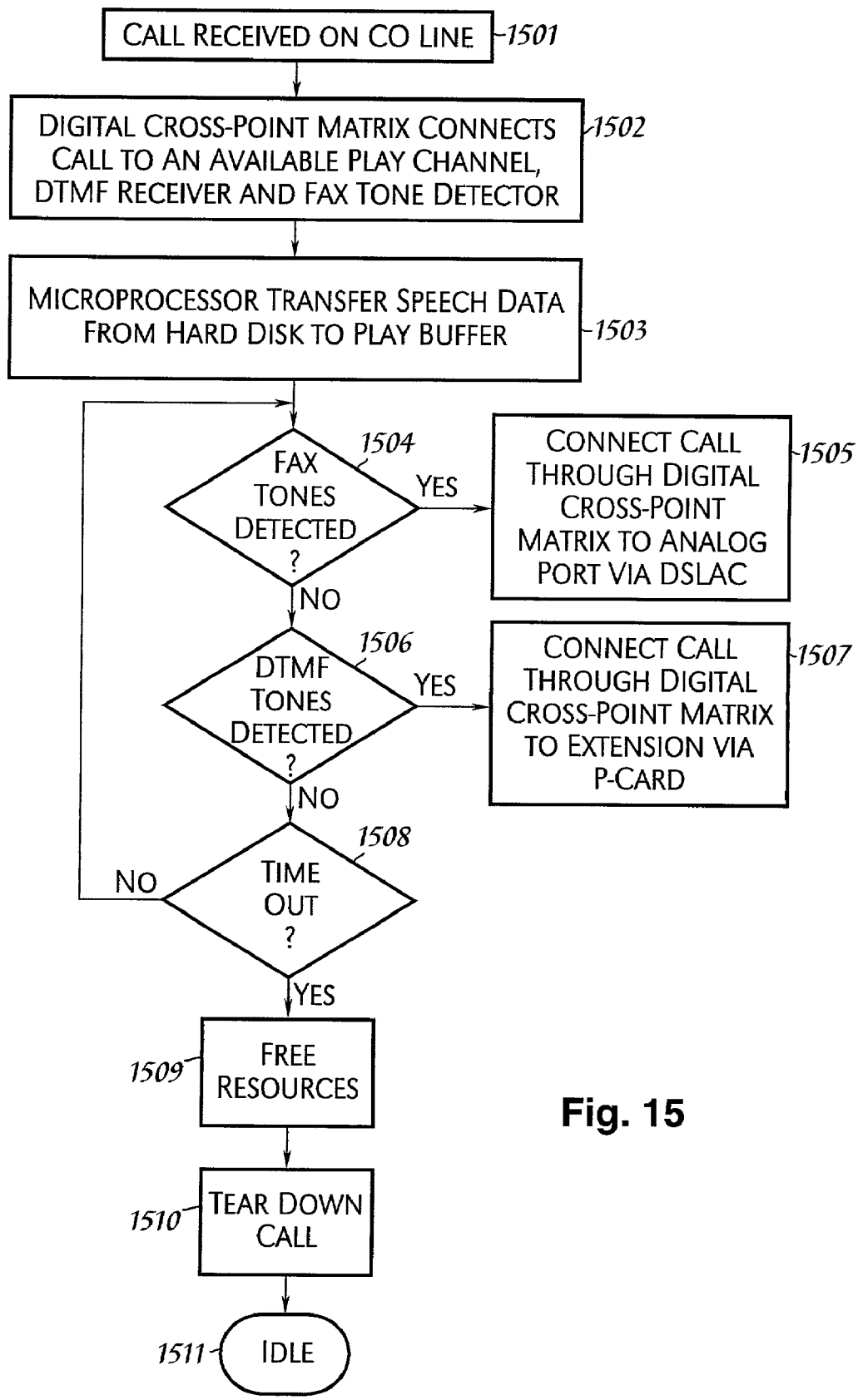
FIG. 15 illustrates a process for implementing an auto attendant within the present invention.

Referring next to FIG. 15, the following is an example of how an auto-attendant call is processed by system 100. A telephone call comes in on one of the available central office ("CO") lines (step 1501). The call is answered and the speech path for the CO line is connected through digital cross-point matrix 103 to an available "play" channel (play buffer 1008) in DSP 102 (step 1502). Also during set-up, a connection is made to an available DTMF receiver 1001. A connection is also made to one of the available fax tone detector channels 1004 in case the incoming call is a facsimile transmission. In step 1503, microprocessor 101 accesses hard disk 107 and transfers speech data to play buffers 1008. Next, in step 1504, a determination is made whether or not FAX tones have been detected by FAX tone detector 1004. If FAX tones are detected, then in step 1505, microprocessor 101 will instruct digital cross-point matrix 103 to connect the incoming call to one of analog ports 115 or 116 coupled to DSLAC 114. If FAX tones are not detected, then the process determines whether or not DTMF tones have been detected in step 1506. If yes, then in step 1507, digital cross-point matrix 103 is instructed to connect the incoming call to an extension coupled to p-card 300. If DTMF tones are not detected, then the process determines whether nor not a predetermined amount of time has passed in step 1508. If yes, then the call is terminated by freeing resources in step 1509 and tearing down the call in step 1510 to place the system in an idle state (step 1511).

If the caller dialed an extension and that extension has answered, a speech path connection is made between the extension and the incoming CO line.

Figure 14:
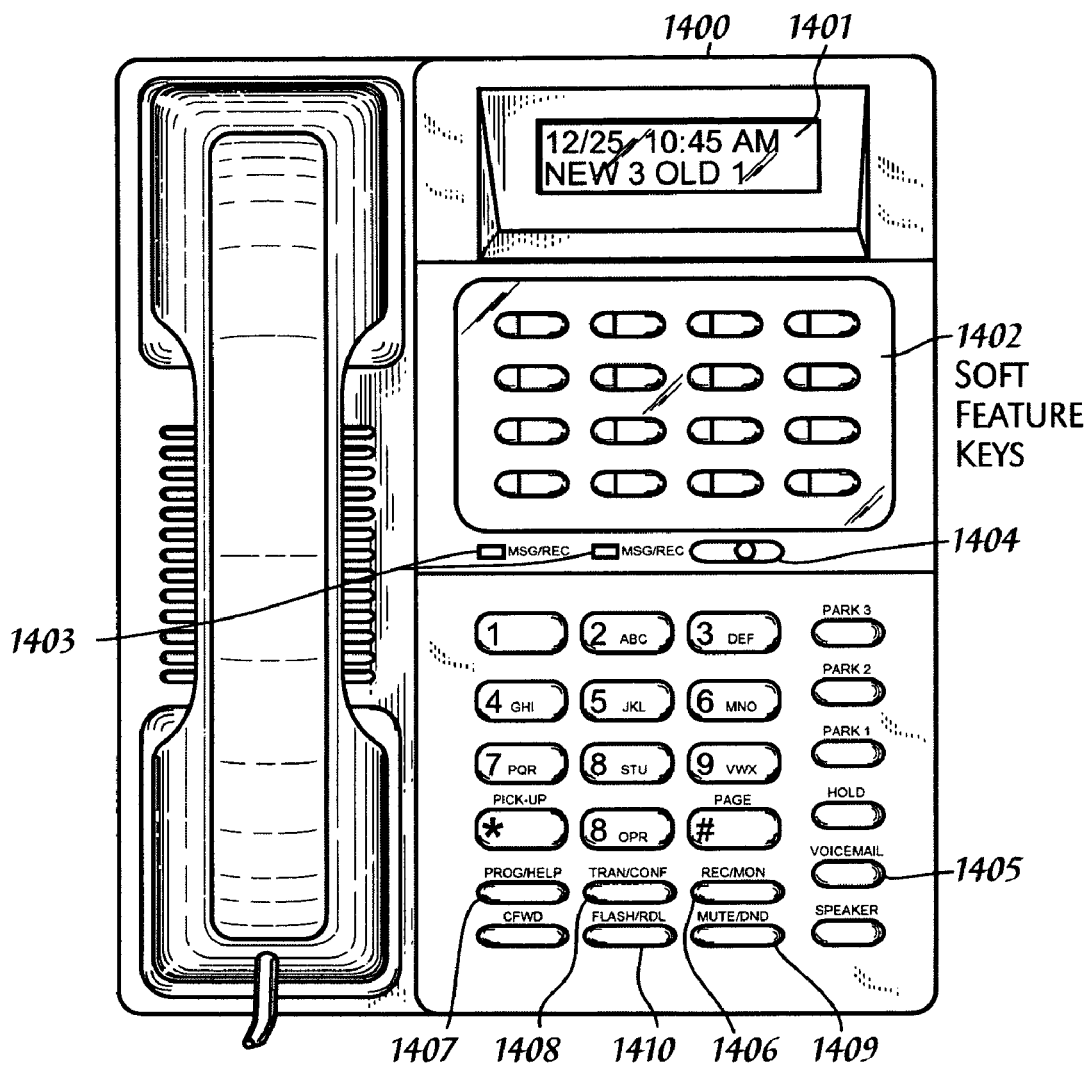
FIG. 14 illustrates an EKT.

Referring next to FIG. 14, there is illustrated EKT 1400, which includes many of the well-known features of a typical telephone, such as LCD display 1401, soft feature keys 1402 for such features as Station, Speed Dial, Line Keys, etc., speaker/handset volume control 1404, and message and speaker LEDs 1403. Of particular interest and described in further detail below are the program/help key 1407, the record/monitor key 1406, and the voice mail key 1405, which are part of the fixed feature keys on EKT 1400.

Figure 4:
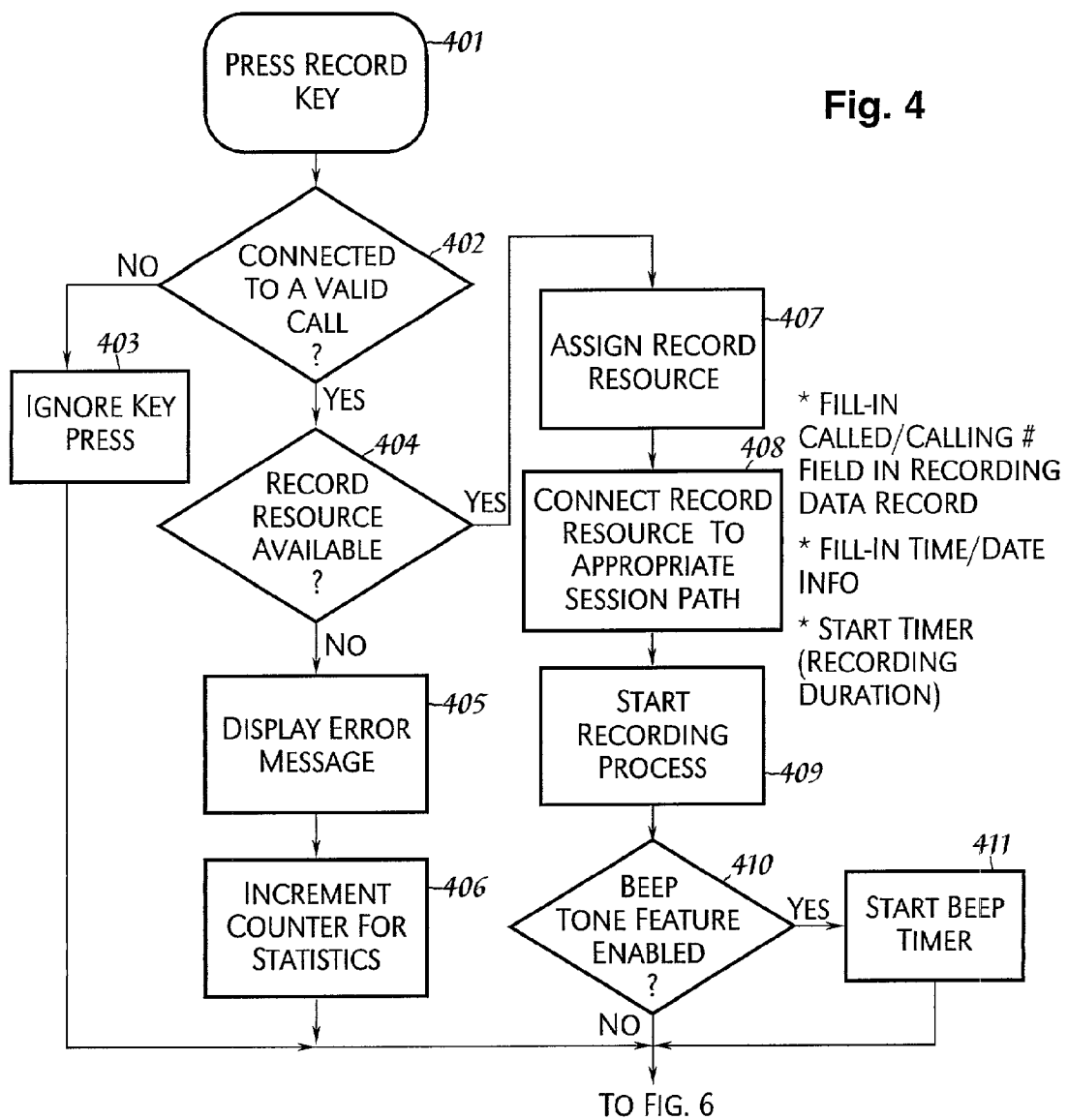
FIG. 4 illustrates a flow diagram of a process for recording an incoming call.

Referring next to FIG. 4, there is illustrated a process for recording all or a portion of an incoming call after it has been connected to a telephone extension (EKT 1400) by digital cross-point matrix 103 and p-card 300. Such a recording can occur while a user is speaking with an incoming call over the extension telephone (EKT 1400). However, such a recording of the incoming call can occur using any telecommunications device coupled to system 100 if it is supplied with some type of mechanism for initiating the recording process to be discussed. In step 401, the user presses record key 1406 on EKT 1400. One skilled in the art will surely appreciate that any means for activating a record signal may be utilized, such as the depression of a physical button, the touching of a touch screen (display 1401 could utilize such a touch screen), or even voice activation of the record sequence. Such a record sequence activation signal may be transmitted from EKT 1400 to interface 306 via transformer 1102 (see FIG. 11), which passes the signal to microprocessor 101 through data transceiver and multiplexer 302 and microcontroller 301. Next, in step 402, a determination is made whether or not EKT 1400 is connected to a valid call. A valid call is defined as energy being detected on the line, and the energy is not dial tone. If not, the process proceeds to step 403 to ignore the record activation signal. However, if EKT 1400 is connected to a valid call, the process proceeds to step 404 to determine whether or not a record resource is available. This may be accomplished by determining whether or not a recording buffer 1003 is available in DSP 102. If not, the process proceeds to step 405 to display an error message to the telephone extension user. This may be accomplished by some type of visual (e.g., on display 1401 or via an LED on EKT 1400) or audible indication provided EKT 1400. This may be implemented by sending from microprocessor 101 to microcontroller 301 such an error message, which is then transmitted to EKT 1400 through data transceiver and multiplexer block 302 and transformer 1102 within interface 306.

Next, in step 406, a counter is incremented to record that a record resource was not available.

If in step 404, a recording buffer 1003 is available in DSP 102, such a recording buffer 1003 is assigned to the record sequence in step 407. Thereafter, in step 408, the recording buffer 1003 is connected to the appropriate speech path via highway 124 and digital cross-point matrix 103. As noted above in the discussion regarding digital cross-point matrix 103, digital cross-point matrix 103 has the ability to couple multiple resources to each other. Therefore, digital cross-point matrix 103 is able to couple recording buffer 1003 (along with automatic gain control function 1002) to the incoming call, which has previously been connected (and remains connected) to the pertinent EKT 1400.

Thereafter, in step 409, the recording process is begun. In addition to recording the ongoing phone conservation, system 100 also stores the called extension number, the incoming calling telephone number, and the date and time of the call. These data are stored in a recording record which is associated with the actual recording. The recording data record is written to hard disk 107, and is available for display when the recording is accessed. At the time the recording begins, a timer is started to accumulate the duration of the recording. When the call is completed, the duration is added to the recording data record, and written to hard disk 107. When the recording is played back, the incoming caller phone number, the date and time of the recording, and the duration are displayed on display 1401. Next, in step 410, a determination is made whether or not a beep tone feature has been enabled. If not, the process proceeds to step 601 in FIG. 6. However, if a beep tone feature has been enabled, the process proceeds to step 411 to start a beep timer, which may be required by law in certain jurisdictions. Implementation of step 411 is further described below with respect to FIG. 5.

The recording sequence illustrated in FIG. 4 may be implemented as a software program stored within hard disk 107, which is up-loaded to DRAM 112 for operation by microprocessor 101.

Figure 6:
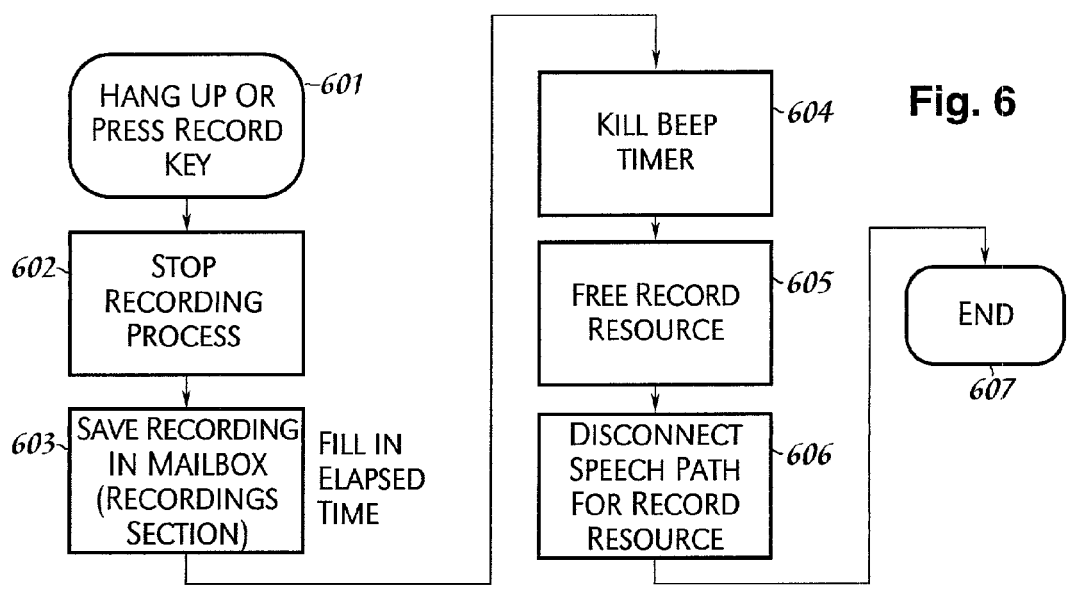
FIG. 6 illustrates a flow diagram for terminating a recording.

Referring next to FIG. 6, there is illustrated a process for terminating a recording sequence. In step 601, one of the parties (the incoming caller or EKT 1400) will hang up, or the termination of the recording sequence may be initiated by again pressing record key 1406 (deactivation of the recording sequence). In response to one of these signals, in step 602, the recording process is stopped. Thereafter, in step 603, the recording, which has been temporarily stored within recording buffer 1003 is recorded in the mailbox assigned to EKT 1400 that initiated the recording sequence. The other data, such as the called and caller telephone numbers, time and date information and recording duration may also be stored within the extension telephone's mailbox. Such a mailbox may be stored within hard disk 107. Thereafter, in step 604, the beep timer is terminated. Thereafter, in step 605, recording buffer 1003, which had been assigned to this record sequence, is freed. Then, in step 606, digital cross-point matrix 103 disconnects the speech path from recording buffer 1003, and the process ends at step 607.

Figure 5:
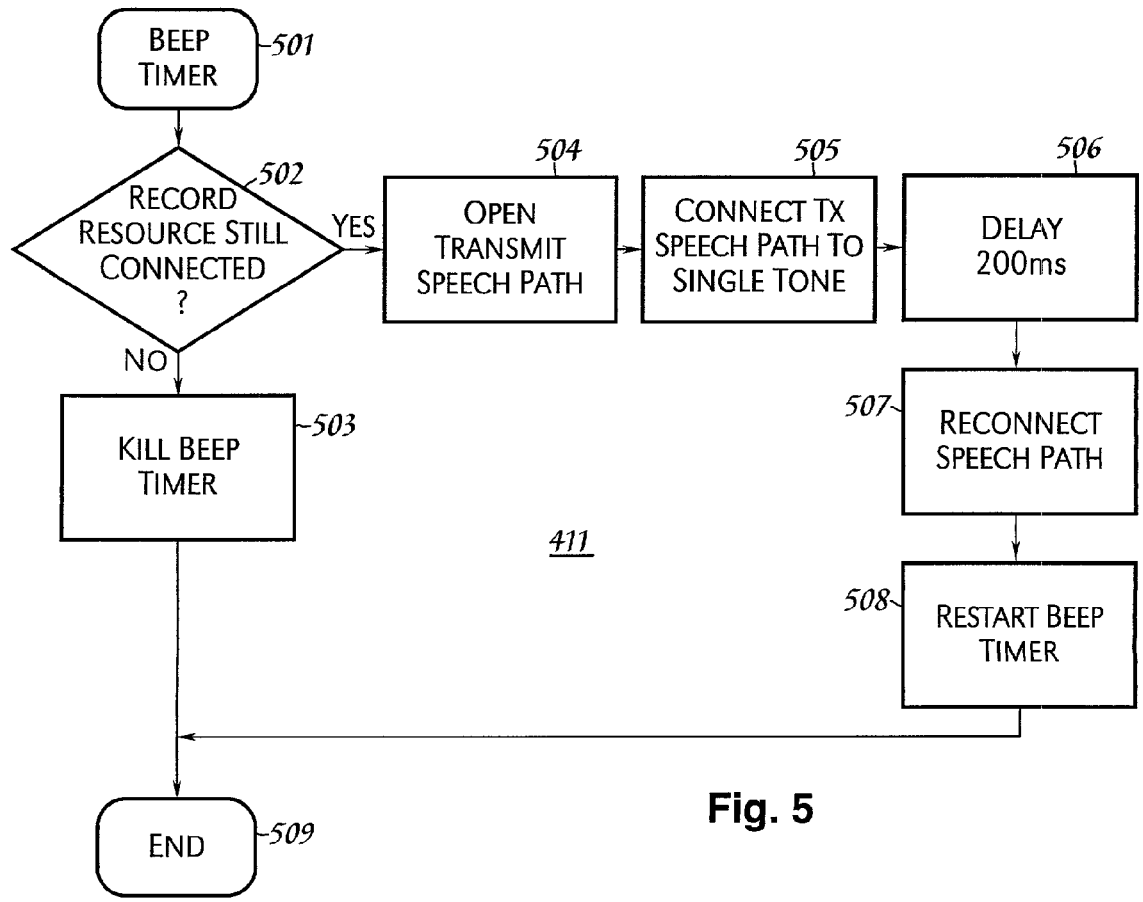
FIG. 5 illustrates a flow diagram of a process for implementing a beep timer.

Referring next to FIG. 5, there is a flow diagram illustrating a process for implementing a beep timer. A beep timer can be provided so that an audible beep is heard by both parties during a conservation that is being recorded. The beep is heard every 15 seconds, and has a configurable duration between 40 and 500 milliseconds. In step 501, the beep timer has been enabled. In step 502, a determination is made whether or not recording buffer 1003 is still connected to the pertinent speech path. If not, the process proceeds to step 503 to terminate the beep timer. However, if recording buffer 1003 is still connected to the speech path by digital cross-point matrix 103, the process proceeds to step 504 where the speech path transmit is opened. Next, in step 505, the speech path is connected to a single tone produced by call processing tone generator 1007 by DSP 102. As a result, the single tone is heard by one or both of the incoming caller and/or EKT 1400 user. In step 506, a delay period (e.g., 200 milliseconds) is allowed to pass. After passage of the delay period, the tone generator 1007 is disconnected from the speech path in step 507. The beep timer process is started again in step 508. The process ends at step 509. One of the advantages of the unique recording sequence of the present invention is that it can be performed without any interruption in the connection between the incoming call and EKT 1400. Additionally, it can be performed with merely the activation of a single signal. However, a sequence of signals can be utilized to initiate the recording sequence, such as the entering of a code by the user using the touch-tone keypad on EKT 1400.

Furthermore, the recording sequence can be initiated while a user is screening an incoming call or while a voice message is being placed in the user's mailbox. These recordings are accomplished following the process described in FIG. 4 as was described earlier for recording all or a portion of an incoming call.

Referring next to FIGS. 7A-7D, there is illustrated a flow diagram for implementing an interactive help sequence (verbal user guide) whereby "help" messages are provided to a user of system 100. This feature can alleviate the need for the user to possess and access a written help manual. Note, however, that one skilled in the art will appreciate that the process illustrated in FIGS. 7A-7D may be utilized to play or display any type of messages to a user, and not just those associated with a help menu.

In step 700, the user presses a key or button 1407 on EKT 1400, wherein the key or button 1407 may be associated with a help menu (or any other information) stored within system 100. A signal activated by the pressing of key 1407 will be sent from EKT 1400 through p-card 300 to microprocessor 101. As noted above with respect to the record sequence, any type of activation signal may be utilized to initiate the sequence. Next, in step 701, microprocessor 101 assigns a play channel or buffer 1008 within DSP 102 to be coupled to EKT 1400 through digital cross-point matrix 103. Next, in step 702, a determination is made whether or not such a play resource (buffer 1008) is available in DSP 102. If not, the process proceeds to step 713 to display an error message on display 1401, or some other type of error indication, such as a tone or LED light 1403, to the user on EKT 1400. This may be done in the same manner as described above with respect to step 405 in FIG. 4. Additionally, a reorder tone may be generated by call processing tone generator 1007 to be connected to EKT 1400. Next, in step 714, a lock-out state is entered. In this lockout state, all key presses on EKT 1400 are ignored, so that the only option for the user is to hang up the phone. Then, in step 715, the process waits for EKT 1400 to go on hook.

If in step 702, a play buffer 1008 is available, then in step 703, microprocessor 101 assigns a play buffer 1008 within DSP 102 to EKT 1400 and digital cross-point matrix 103 connects, via highway 124, play buffer 1008 and associated filter 1009 to the time slot with which EKT 1400 is associated. Additionally, microprocessor 101 may couple a DTMF receiver 1001 within DSP 102 to the time slot in digital cross-point matrix 103 associated with EKT 1400 in order to recognize any DTMF tones actuated on EKT 1400 by the user (see steps 705 and 707-710 described below). Thereafter, in step 704, an introductory prompt message is played to the user on EKT 1400. Such a message may be downloaded from hard disk 107 through microprocessor 101 to play buffer 1008. Such a message may be "To access the help menu, press 0." Thereafter, in step 705, a determination is made whether or not the "0" key on EKT 1400 has been pressed by the user. If not, the process proceeds to step 712 which operations a time out function. If the "0" key has been pressed in step 705, the process proceeds to step 706 where another "Help" prompt is played by play buffer 1008 to the user via the speaker on EKT 1400. Such a message may be "To learn how to program your phone, press 1, to learn how to use voice mail, press 2 . . . ."

Next, in steps 707-710, determinations are made whether the user depresses a digit on the touch-tone keys of EKT 1400 (or voice activation may be utilized in response to the user stating a number) in response to the introductory prompt message 706. A DTMF receiver 1001, which has been connected to the speech path associated with EKT 1400 initiating the help sequence (see step 703), recognizes which of digits 707-710 have been depressed and plays a corresponding prompt message (see steps 720, 740, 760), in response thereto as programmed within system 100. For example, in step 707, if the "1" key on EKT 1400 is pressed by the user, then the process proceeds to step 720 in FIG. 7B where an introductory prompt is played to the user regarding use of the EKT 1400, which may include options presented to the user for pressing certain digits to access associated help information. For example, if the "1" key is pressed by the user in step 721, then in step 722 a prompt may be played to the user regarding how to answer the telephone using the features of EKT 1400. If the "2" key is pressed on EKT 1400 by the user (step 723), then, in step 724, a prompt may be played to the user on how to place a call using EKT 1400. If the "3" key is pressed by the user (step 725), then, in step 726, a prompt may be played to the user on how to transfer a call. Similarly, if the "4" key is pressed by the user (step 727), then a prompt may be played to the user on how to conference a call (step 728). If system 100 determines that the "5" key has been pressed on EKT 1400 by the user in step 729, then a prompt on how to answer a call under Call Waiting may be played to the user in step 730.

After each of prompts 722, 724, 726, 728, and 730 have been played to the user, the process returns to step 720 to repeat the process. However, if the user presses the "#" key in step 731, then the process returns to step 706 in FIG. 7A. A time-out feature is implemented in step 732. Thus, if the user does not press any key after step 720 after a predetermined amount of time, the process will proceed to step 716 in FIG. 7A.

If the user has pressed the "2" key in step 708, the process will proceed to step 740 (FIG. 7C) to play an introductory prompt regarding the use of voice mail. Such a message may provide the option to listen to further messages upon the pressing of selected keys on EKT 1400. For example, if in step 741, it is determined that the user has pressed the "1" key, then the process, in step 742, will play a message on how to leave a message. Likewise, steps 743 and 744 implement a process for playing a message on how to transfer a call to voice mail. Steps 745 and 746 implement a process for informing the user on how to pick up an internal voice mail. Additionally, steps 747 and 748 implement a process for informing the user on how to pick up an external voice mail. Likewise, steps 749 and 750 implement a process for informing the user on how to record a personal greeting for their voice mail box.

Again, in a manner similar to that described previously with respect to step 731, in step 751, a process is implemented for permitting the user to return to step 706. The time out function is implemented in step 752 in manner similar to that described previously with respect to step 732.

Figure 7A:
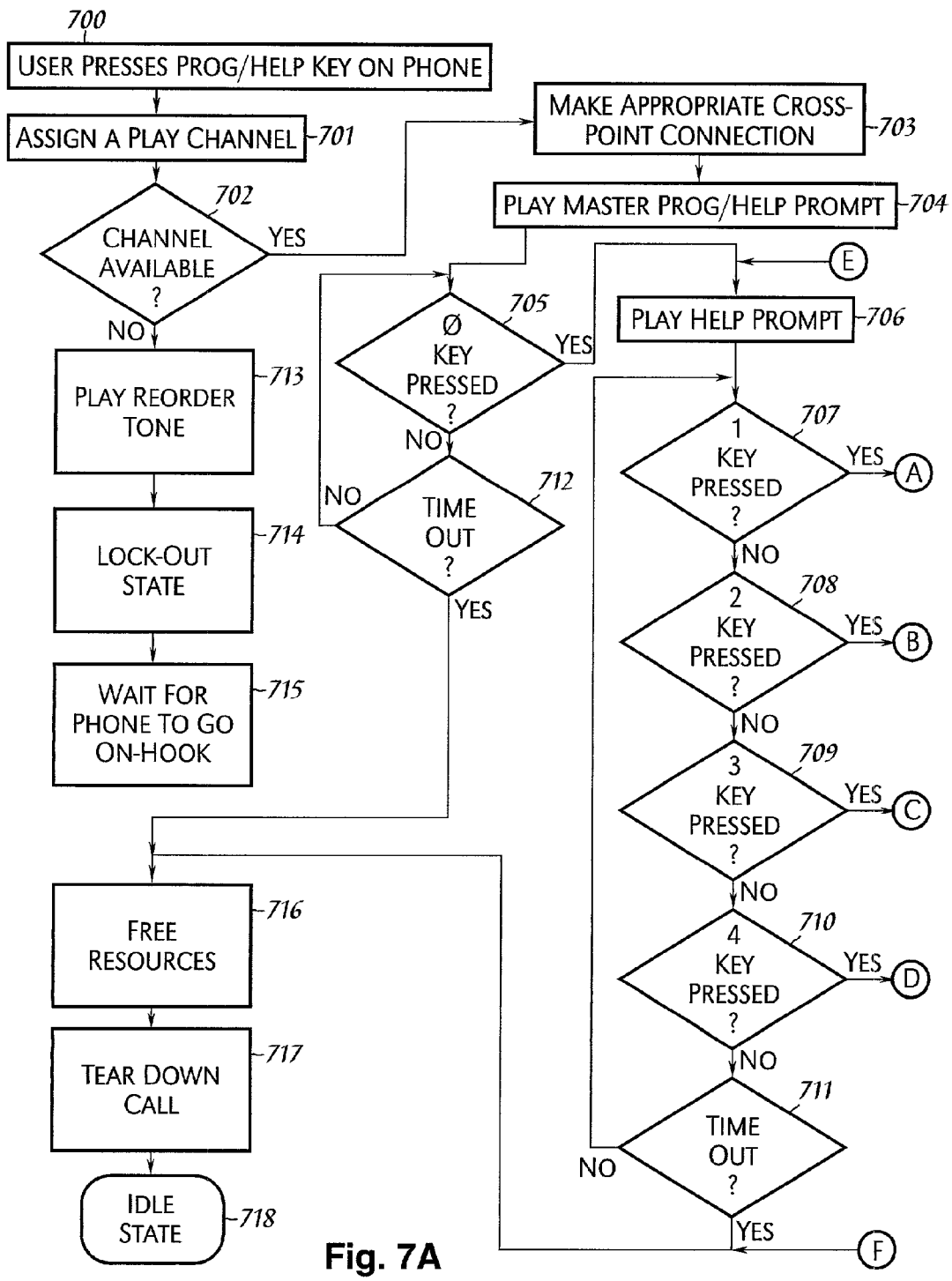
FIGS. 7A-7D illustrate a flow diagram implementing interactive help.
Figure 7B:
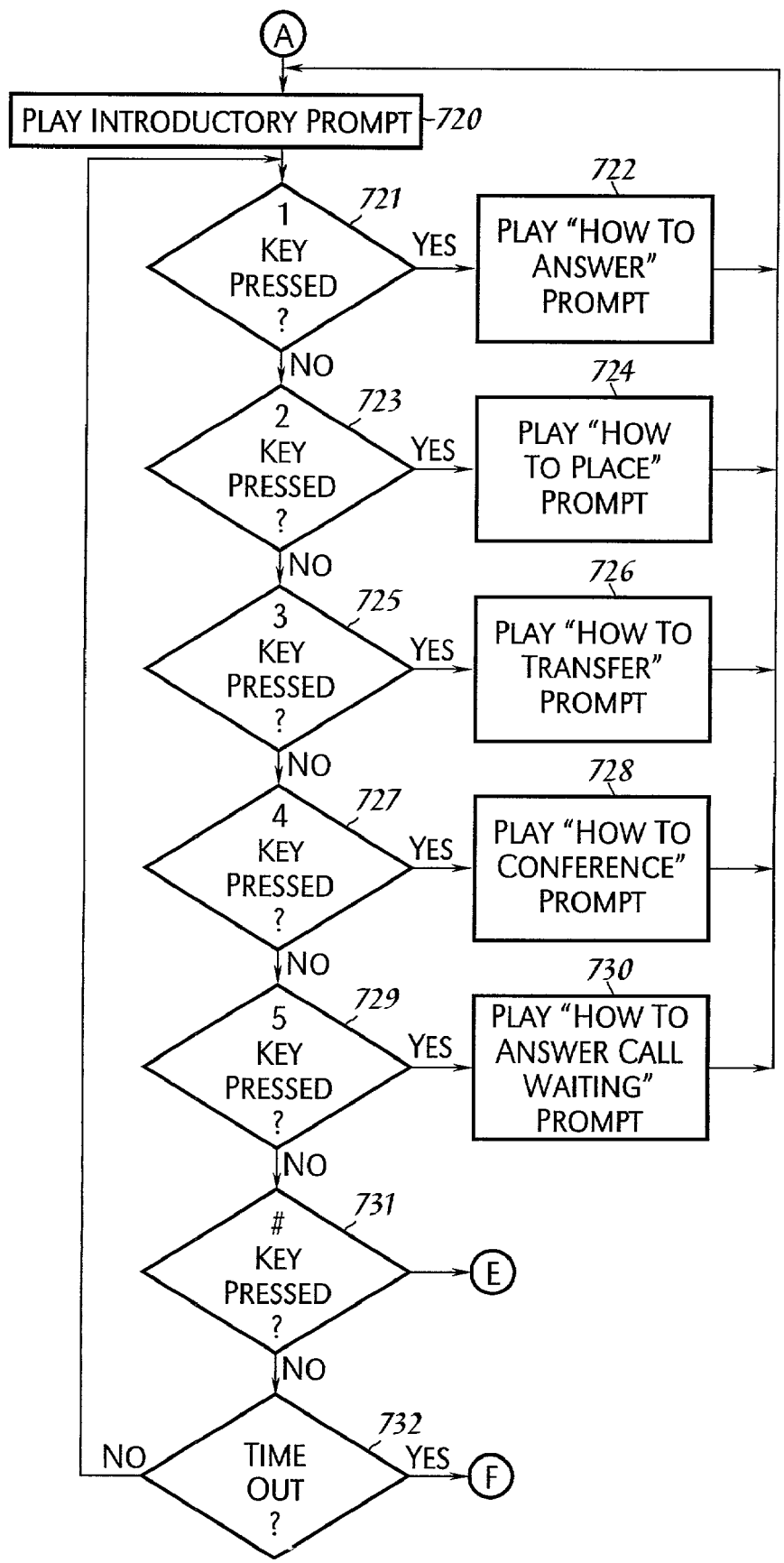
Figure 7C:
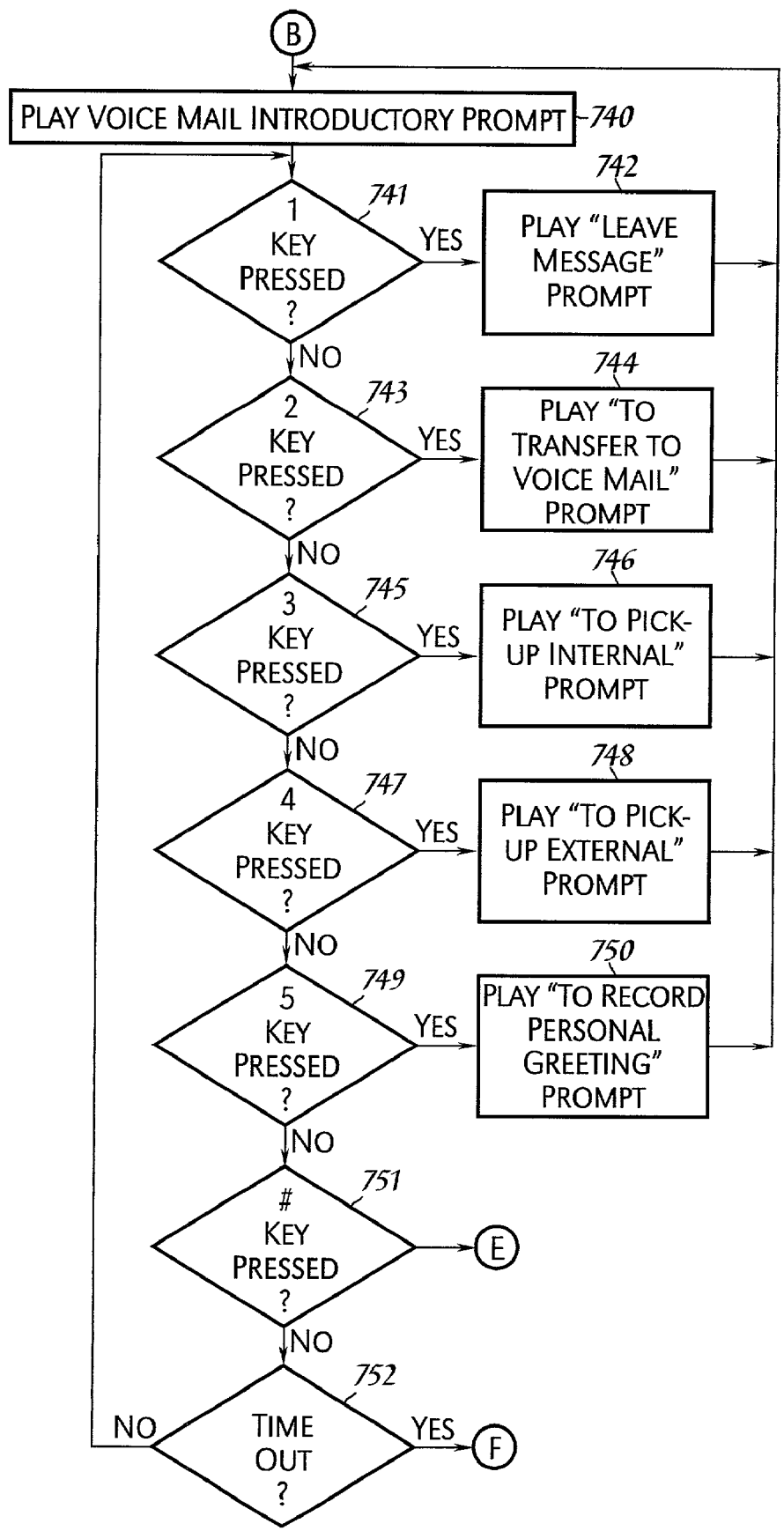
Figure 7D:
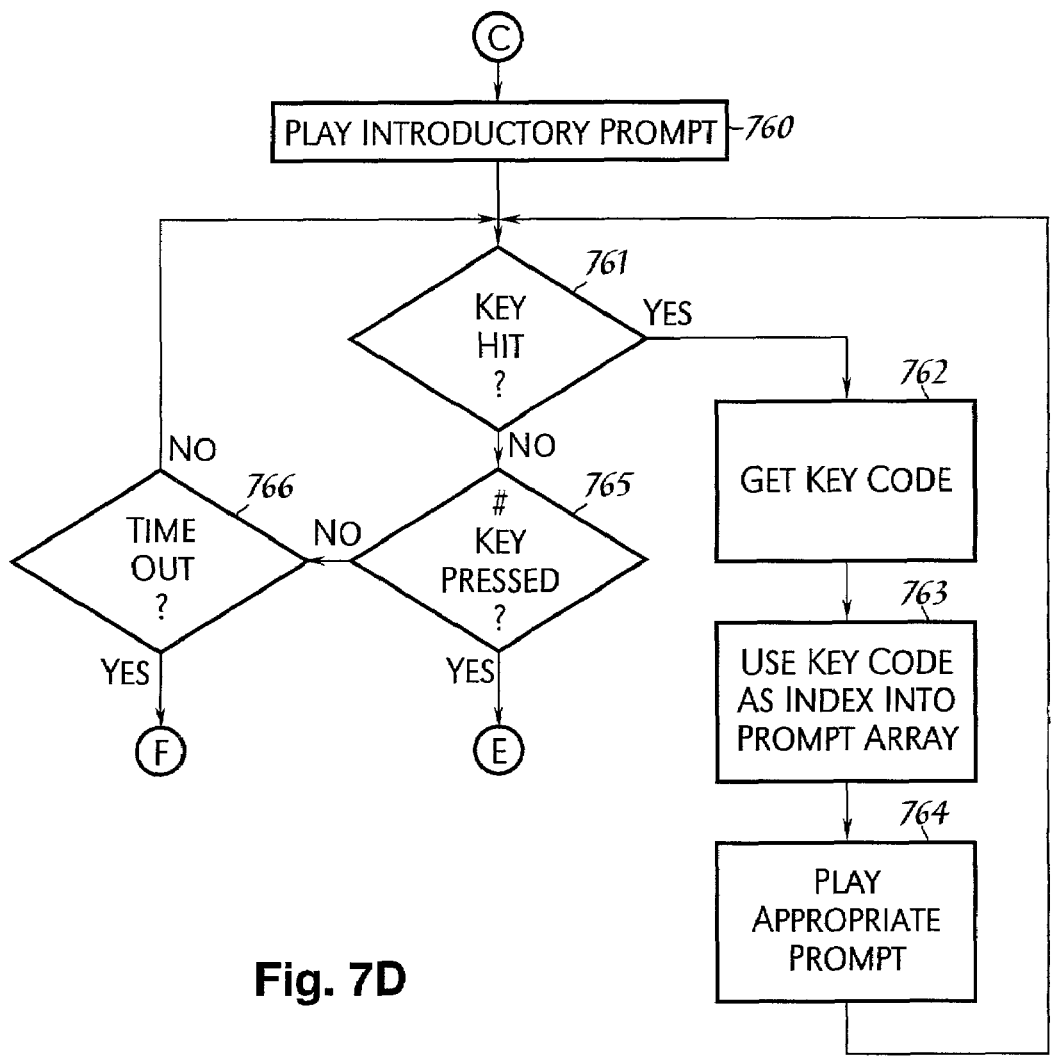

Returning to FIG. 7A, if, in step 709, the user presses the "3" key, then the process proceeds to step 760 in FIG. 7D to play an introductory prompt regarding help information on various phone features. In the process illustrated in FIG. 7D, the user may then press any key on EKT 1400 and receive help information corresponding to the pressed key. In step 761, the process determines whether a key has been hit or pressed by the user. If yes, in step 762, whichever key has been pressed by the user, the signal generated by EKT 1400 corresponding to the pressed key is analyzed by DTMF receiver 1001, so that microprocessor 101 can access an appropriate help message to play to the user using play buffer 1008. This is performed in step 763, where the key code may be used as an index into a prompt, or message, array stored within system 100. The playing of the corresponding message is performed in step 764. The process then returns to step 761 to determine whether or not another key has been pressed by the user. Step 765 determines whether or not at this time the "#" key has been pressed by the user. If yes, the process then returns to step 706.

The time-out feature implemented in step 766 provides for an exit to step 716 in FIG. 7A if no key is pressed by the user within a predetermined amount of time.

Returning to FIG. 7A, if in step 712, a predetermined amount of time does pass before the "0" key has been pressed by the user as determined by step 705, the process will proceed to step 716 to free any accessed resources. Tearing down of the call is then performed in step 717 so that the phone is placed in an idle state (step 718). Steps 716-718 are also entered if a predetermined amount of time passes in steps 711, 732, 752, or 766.

Figure 8:
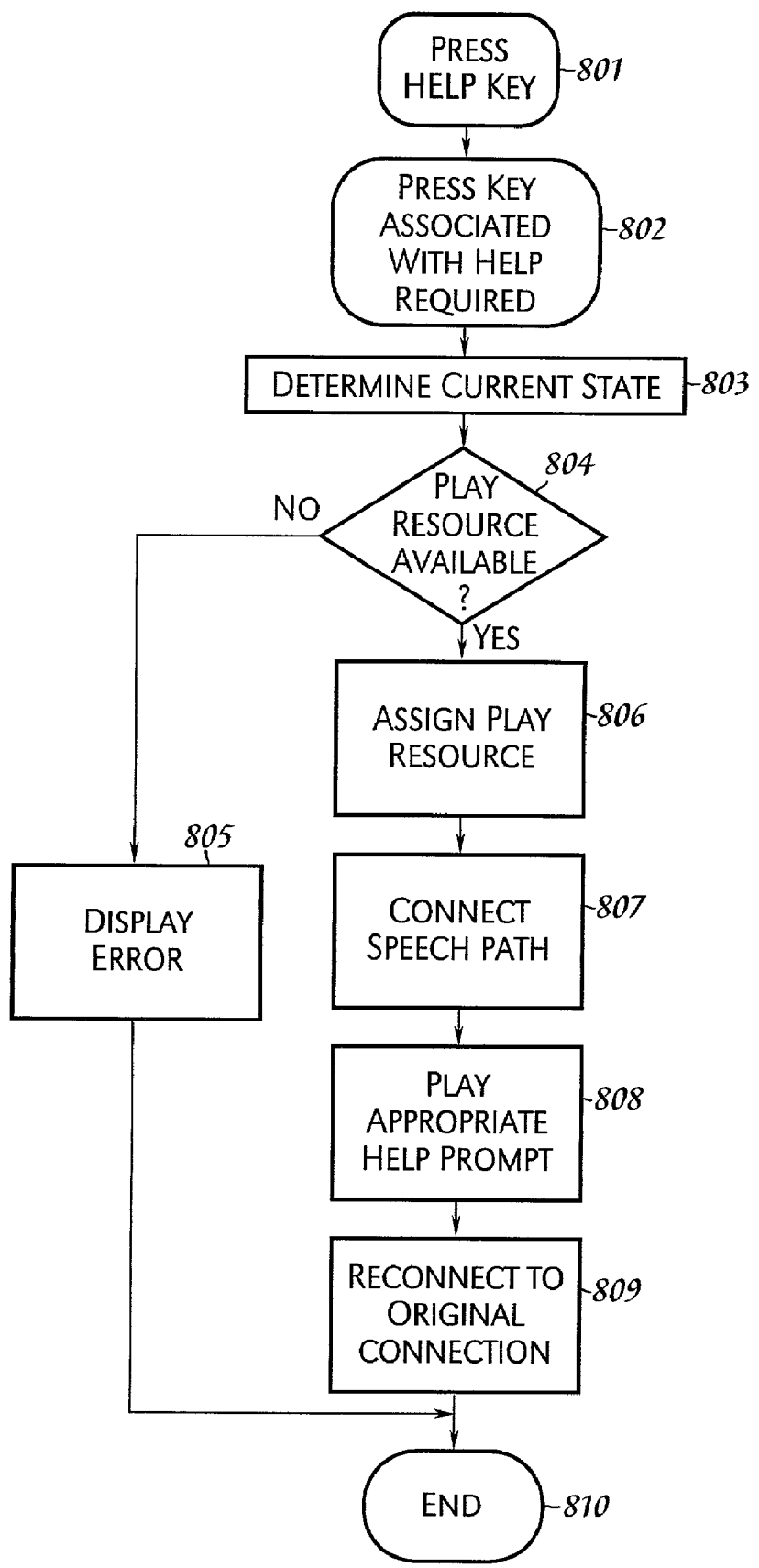
FIG. 8 illustrates a flow diagram for implementing context sensitive help.

Referring next to FIG. 8, there is illustrated a flow diagram for implementing a context sensitive help menu. Such a help sequence can be implemented so that the help messages sent to the user relate to the particular function the user is currently implementing. Note that FIG. 8 applies when the user is already connected to an outside call (a call which is not an intercom call). In step 801, the user presses help key 1407, or performs some other type of activation of the help sequence, such as described above with respect to step 701 in FIG. 7A. Thereafter, in step 802, the user presses the specific key that help is required on. For example, if the user is connected to an outside call, and needs to transfer the call, the user may press the help key 1407, followed by the transfer key 1408 to receive instructions. While the user is receiving instructions, the other party is hearing music provided via music source 119. Thereafter, in step 804, a determination is made whether or not a play resource is available in DSP 102. In other words, a determination is made whether or not a play buffer 1008 is available. If not, an error message is provided to the user in step 805 in a manner similar to the one described above with respect to step 712 in FIG. 7A.

If a play resource is available in step 804, the process proceeds to step 806 to assign a play resource. Thereafter, in step 807, the play resource (i.e. play buffer 1008 and associated filter 1009) is connected to the speech path to which EKT 1400 is connected. Thereafter, in step 808, the appropriate help message is played to the user by first downloading the help message from hard disk 107 via microprocessor 101 to the play buffer 1008. Thereafter, in step 809, after the help message has been played to the user, the user is reconnected to the other party in the call. The process ends at step 810.

Figure 9:
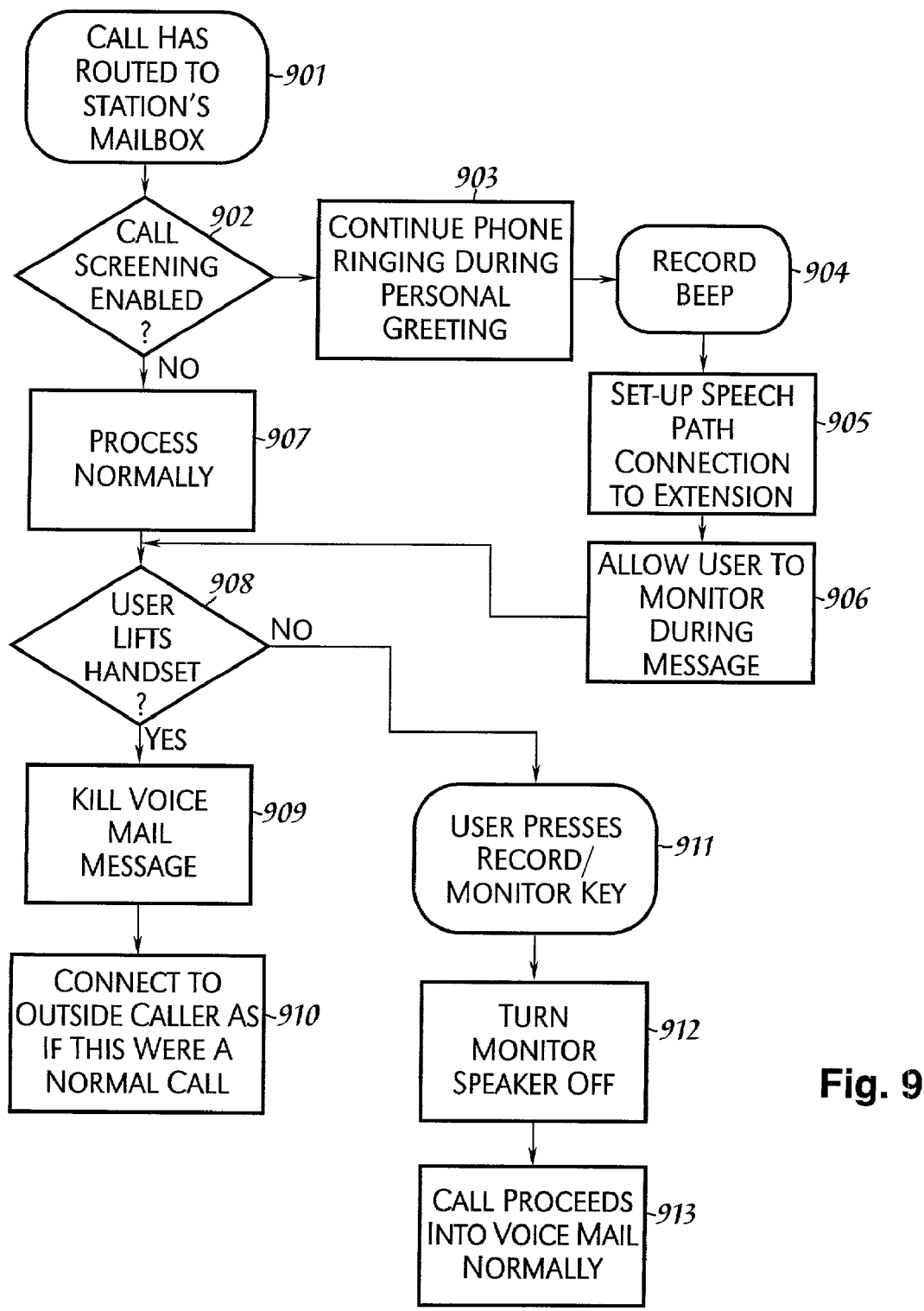
FIG. 9 illustrates a flow diagram implementing real-time call screening.

Referring next to FIG. 9, there is illustrated a flow diagram for implementing real-time call screening. This process works similarly to the process implemented within a home answering machine. It allows a station user to listen to calls being left in their mailbox. If desired, the user can then lift the handset of EKT 1400 to intercept the call at any time. The process begins in step 901, where an incoming call has been routed to an extension and the extension has not answered the call. After a configurable number of rings, the call is transferred to the extension's mailbox. Thereafter, in step 902, a determination is made whether or not the call screening application has been enabled. Each extension may enable call screening mode by pressing key 1406 while the extension is idle. If not, system 100 processes the incoming call normally in step 907 where the incoming call may leave a message in the station's mailbox.

However, if in step 902, call screening has been enabled, the process proceeds to step 903 where EKT 1400 associated with the station that was called continues to ring while the mailbox plays a message to the incoming call. In step 904, the incoming caller hears a beep, which indicates it is the proper time to leave a message. Next, in step 905, a speech path is set up to the EKT 1400 that was called, so that the message can be heard on the EKT 1400 speaker as it is being left. Thereafter, in step 906, the user is permitted to monitor the message while it is being left by the incoming call. Next, in step 908, the user may lift their handset. If so, in step 909, the voice mail messaging is terminated. In step 910, the incoming call is connected to the station user by digital cross-point matrix 103. If in step 908 the user does not lift their handset, then the process proceeds to step 911 when the user presses the record/monitor key 1406, the process proceeds to step 912 to turn the monitor speaker off, and then in step 913 the call proceeds into voice mail in a normal fashion.

Figure 16:
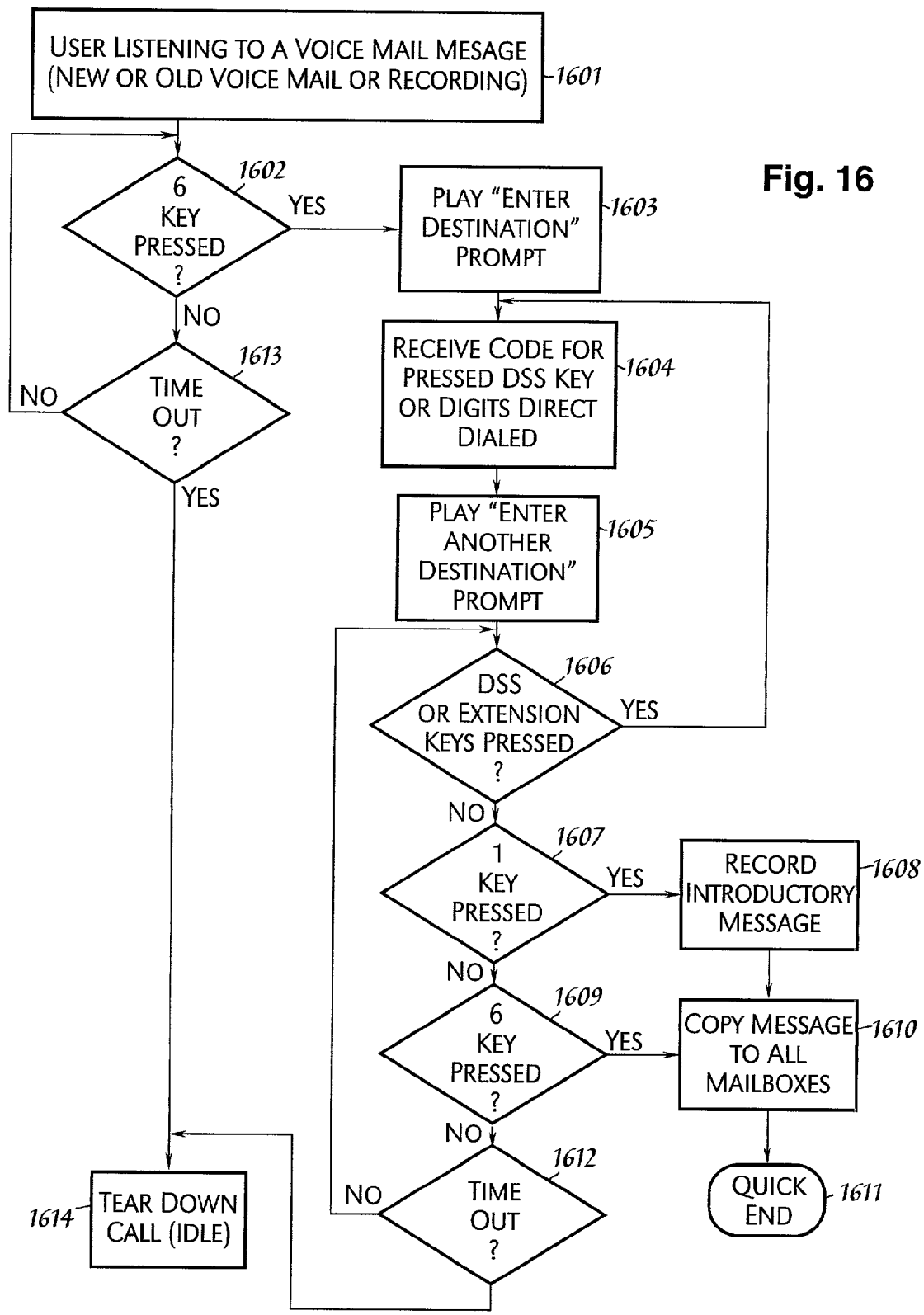
FIGS. 16-17 illustrate processes for implementing Quick Groups.

Referring next to FIG. 16, there is illustrated a flow diagram for implementing Quick Groups, which allows a user to leave or copy a voice mail message to multiple destination mailboxes by merely pressing the desired Direct Station Select (DSS) key or dialing the number of the extension. There are 16 DSS keys at 1402, on each EKT 1400. These DSS keys can be programmed to provide one button access to extensions and outside lines. In step 1601, the user of EKT 1400 is listening to a voice mail message, which may be a "new" or "old" voice mail message previously recorded into the user's mail box, or the user may be listening to the voice mail message while it is being recorded by another person into the user's mail box. Thereafter, in step 1602, a determination is made whether or not a specified key (in this example, the "6" key) has been pressed by the user. If not, a time-out operation is implemented with step 1613. If the specified key has been pressed by the user in step 1602, the process proceeds to step 1603 to play a message to the user, which may prompt to the user to enter a destination. Thereafter, in step 1604, the system receives the code for the entered destination, which may be a pressed DSS key or digits dialed by the user on EKT 1400.

Next, in step 1605, another message is played to the user requesting that the user enter another destination for the voice mail message to be sent. In step 1606, a determination is made whether or not the user has pressed another DSS key or has entered an extension. If yes, the process returns to step 1604 where the signals associated with the pressed digits or DSS key are received. However, if the user has not entered another destination, a determination is made in step 1607, whether or not a specified key (in this example the "1" key) has been pressed by the user. If yes, in step 1608, the system plays a message to the user requesting if the user wishes to record an introductory message to be appended to the beginning of the voice mail message sent by the user. Any message entered by the user is recorded by a record buffer 1003, which has been coupled to EKT 1400 by digital cross-point matrix 103. Next, in step 1610, the introductory message left by the user and the voice mail message noted in step 1601 is copied to all mailbox destinations entered by the user in steps 1604-1606. The process then ends at step 1611.

Step 1609 implements a method by which the user can press a specified key (in this example, the "6" key) in order to copy the voice mail message noted in step 1601 to destinations entered by the user in step 1610, in the instance where the user has not decided to record an introductory message (see steps 1607-1608).

Step 1612 permits a return to step 1606 for a specified amount of time. If such a specified amount of time has passed without any buttons pressed by the user, then the process proceeds to step 1614 to tear down the call and enter an idle state.

Figure 17:
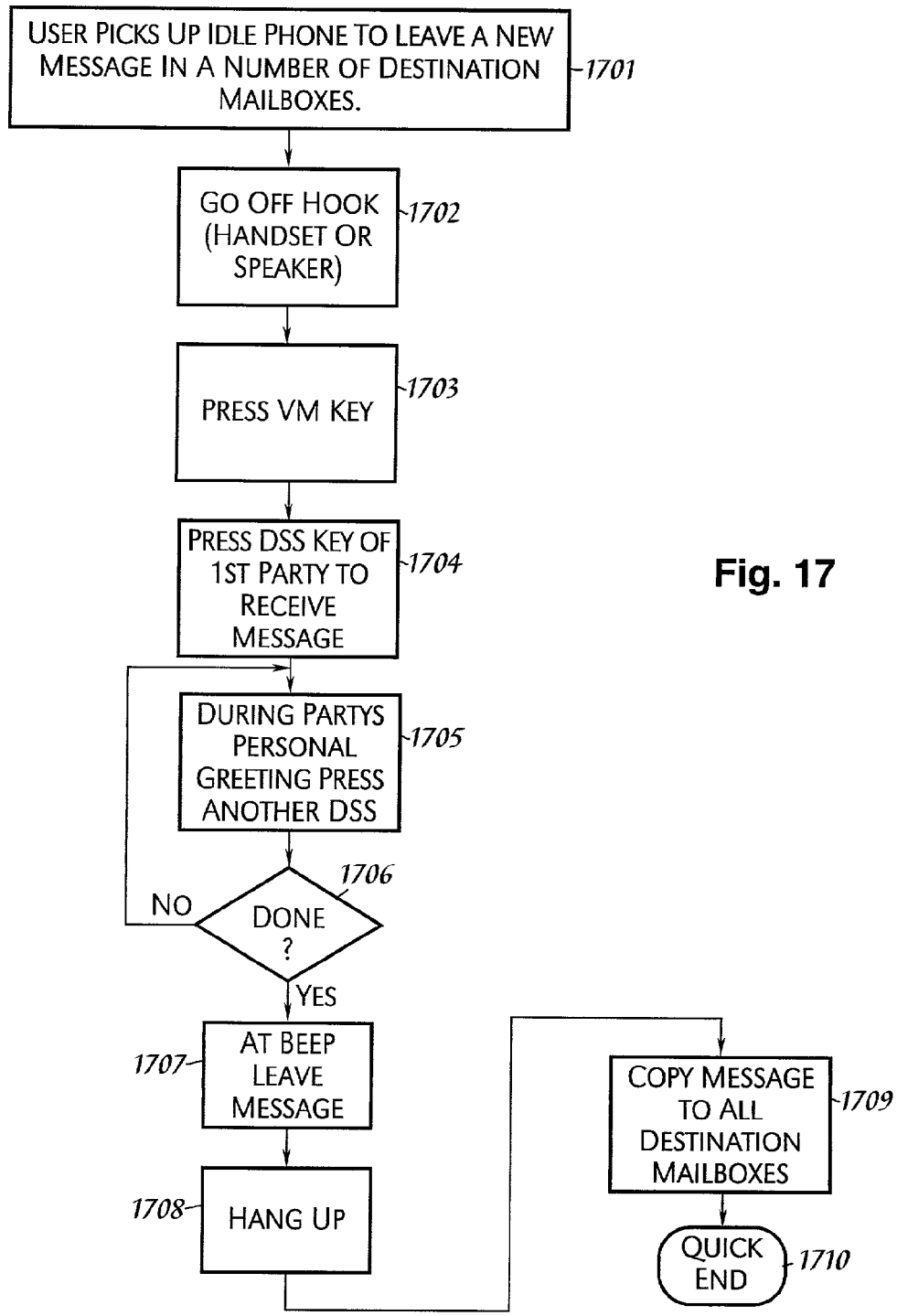

Referring next to FIG. 17, there is illustrated another process for implementing Quick Groups. This process enables a user to leave a new message entered by the user for recording into a number of destination mailboxes specified by the user. In step 1701, the user picks up an idle EKT 1400 for the purpose of leaving a new message in a number of specified destination mailboxes. In response, in step 1702, EKT 1400 goes off hook. Thereafter, in step 1703, the user presses voice mail key 1405. Thereafter, in step 1704, the process provides for the user to press a DSS key or digits associated with a destination extension. In step 1705, the user presses the DSS key or dials the digits associated with each extension which is to be added to the group to receive the message. In step 1706, once all the extensions to receive the message have been selected, the process proceeds to step 1707, where upon hearing the voice mail beep of the destination, the user leaves the desired message. In step 1708, the user then hangs up EKT 1400 by going on hook.

Thereafter, in step 1709, the user copies the message to all other desired destination mailboxes. The process then ends at step 1710.

Although the present invention and its advantages have been described in detail, it should be understood that various changes, substitutions and alterations can be made herein without departing from the spirit and scope of the invention as defined by the appended claims.

What is claimed is:

1. A telephone call and voice processing system comprising:
   switching circuitry for receiving a call, wherein the switching circuitry connects the call to one of a plurality of telecommunications devices coupled to the system in accordance with information accompanying the call that identifies the telecommunications device, wherein two or more of the plurality of telecommunications devices each further comprises both a speaker and a microphone for enabling a user to audibly communicate with the call; and
   voice processing circuitry for automatically interacting with the call to direct the call to a voice mailbox if a user of the telecommunications device does not answer the call, wherein the switching circuitry and the voice processing circuitry are controlled by not more than one microprocessor.

2. The system as recited in claim 1, wherein the voice processing circuitry further comprises a signal processing circuitry coupled to the one microprocessor.

3. The system as recited in claim 1, further comprising:
   circuitry for listening to a voice signal at a telephone extension coupled to the system;
   circuitry for activating a recording sequence to record the voice signal; and
   circuitry for storing the recorded voice signal in a digital memory.

4. The system as recited in claim 3, wherein the activating circuitry is tactilely initiated by a user of the telephone extension.

5. The system as recited in claim 4, wherein the voice signal originated from the call.

6. The system as recited in claim 1, wherein the information is detected DTMF tones.

7. The system as recited in claim 1, wherein the call is received by the switching circuitry from a central office trunk line.

8. A telephone call and voice processing system comprising:
switching circuitry for receiving a call, wherein the switching circuitry connects the call to a telecommunications device coupled to the system; and
voice processing circuitry for automatically interacting with the call, wherein the switching circuitry and the voice processing circuitry are controlled by a single processing means, wherein the voice processing circuitry further comprises a signal processing circuitry coupled to the single processing means, wherein the switching circuitry further comprises a digital crosspoint matrix coupled to the single processing means and to the signal processing circuitry.

9. The system as recited in claim 8, wherein the voice processing circuitry automatically interacts with the call to direct the call to a voice mailbox if a user of the telecommunications device does not answer the call.

10. A telephone call and voice processing system comprising:
a plurality of telecommunications devices coupled to the system as extensions;
switching circuitry for receiving a call, wherein the switching circuitry connects the call to one of the telecommunications devices; and
voice processing circuitry for automatically interacting with the call, wherein the switching circuitry and the voice processing circuitry are controlled by a single processing means, wherein the single processing means is controlled by a single set of software operable for controlling both the switching circuitry and the voice processing circuitry.

11. The system as recited in claim 10, wherein the call is received from a source external to the system, and is connected to one of the telecommunications devices in accordance with detected DTMF tones accompanying the call, wherein the DTMF tones identify the telecommunications device to which the call is directed.

12. A telephone call and voice processing system comprising:
switching circuitry for receiving a call, wherein the switching circuitry connects the call to a telecommunications device coupled to the system, wherein two or more of the plurality of telecommunications devices each further comprises both a speaker and a microphone for enabling a user to audibly communicate with the call; and
voice processing circuitry for automatically interacting with the call to direct the call to a voice mailbox if the telecommunications device does not go off-hook to answer the call, wherein the switching circuitry and the voice processing circuitry are controlled by a single processing means, wherein the voice processing circuitry further comprises a signal processing circuitry coupled to the single processing means, wherein the signal processing circuitry further includes:
a DTMF receiver operable for recognizing DTMF tones from the call and instructing the switching circuitry to connect the call to the telecommunications device identified by the DTMF tones.

13. A telephone call and voice processing system comprising:
switching circuitry for receiving a call, wherein the switching circuitry connects the call to one of a plurality of telecommunications devices coupled to the system in accordance with information accompanying the call that identifies the telecommunications device, wherein two or more of the plurality of telecommunications devices each further comprises both a speaker and a microphone for enabling a user to audibly communicate with the call;
voice processing circuitry for automatically interacting with the call, wherein the switching circuitry and the voice processing circuitry are controlled by not more than one microprocessor; wherein the voice processing circuitry further comprises a signal processing circuitry coupled to the one microprocessor; and
circuitry operable for recording all or a portion of the call during an off-hook state after the telecommunications device is connected to the call.

14. The system as recited in claim 13, wherein the recording circuitry operates in response to a user manually pressing a button on a telephone set.

15. A telephone call and voice processing system comprising:
switching circuitry for receiving a call, wherein the switching circuitry connects the call to one of a plurality of telecommunications devices coupled to the system in accordance with information accompanying the call that identifies the telecommunications device;
voice processing circuitry for automatically interacting with the call, wherein the switching circuitry and the voice processing circuitry are controlled by not more than one microprocessor; and
circuitry operable for recording all or a portion of the call during an off-hook state after the telecommunications device is connected to the call, wherein the recording circuitry operates in response to a user manually pressing a button on a telephone set, and wherein the recording circuitry further comprises:
circuitry for coupling a recording buffer in signal processing circuitry to the call, wherein the signal processing circuitry is coupled to the one microprocessor.

16. A telephone call and voice processing system comprising:
switching circuitry for receiving a call, wherein the switching circuitry connects the call to a telecommunications device coupled to the system, wherein two or more of the plurality of telecommunications devices each further comprises both a speaker and a microphone for enabling a user to audibly communicate with the call;
voice processing circuitry for automatically interacting with the call, wherein the switching circuitry and the voice processing circuitry are controlled by a single processing means;
circuitry for listening to a voice signal at a telephone extension coupled to the system;
circuitry for activating a recording sequence to record the voice signal; and
circuitry for storing the recorded voice signal in a digital memory, wherein the activating circuitry is tactically initiated by a user of the telephone extension, wherein the voice signal originated from a voice mail message stored in the system.

17. In a telephone call and voice processing system comprising switching circuitry for receiving an incoming call from a source external to the system, wherein the switching circuitry connects the incoming call to a telecommunications device coupled to the system from among a plurality of telecommunications devices connected as telephone extensions of the switching circuitry, and voice processing circuitry for automatically interacting with the call, wherein the switching circuitry and the voice processing circuitry are controlled by a single processing means, a method comprising the steps of:

listening to a voice signal at a telephone extension coupled to the system;

activating a recording sequence to record the voice signal; and storing the recorded voice signal in a memory.

18. The method as recited in claim 17, wherein the activating step is tactilely initiated by a user of the telephone extension.

19. The method as recited in claim 17, wherein the voice signal originated from the call to the system.

20. The method as recited in claim 17, wherein the voice signal originated from a voice mail message stored in the system.

21. The method as recited in claim 17, wherein the external source is a central office trunk line.

22. The method as recited in claim 17, wherein the switching circuitry connects the incoming call to one of the plurality of telecommunications devices in response to information accompanying the incoming call that identifies the telecommunications device to which the incoming call is connected to.

23. A telephone call and voice processing system comprising:

switching circuitry for receiving an incoming call from a source external to the system, wherein the switching circuitry connects the incoming call to one of a plurality of telecommunications devices coupled to the system as extensions to the system; and voice processing circuitry for automatically interacting with the call to direct the call to a voice mailbox if the extension does not go off-hook to answer the call, wherein the switching circuitry and the voice processing circuitry are controlled by a single microprocessor.

24. The system as recited in claim 23, wherein the external source is a central office trunk line.

25. The system as recited in claim 23, wherein the switching circuitry connects the incoming call to one of the plurality of extensions in response to information accompanying the incoming call that identifies the one of the plurality of extensions.

26. The system as recited in claim 25, wherein the information is detected DTMF tones.

27. A telephone call and voice processing system comprising:

switching circuitry for receiving a call, wherein the switching circuitry connects the call to one of a plurality of telecommunications devices coupled to the system; and voice processing circuitry for automatically interacting with the call to direct the call to a voice mailbox if the extension does not go off-hook to answer the call, wherein the switching circuitry further comprises a digital cross-point matrix.

28. A telephone call and voice processing system comprising:

switching circuitry for receiving a call, wherein the switching circuitry connects the call to one of a plurality of telecommunications devices coupled to the system;

the plurality of telecommunications devices connected to the system as telephone extensions accessible by the system solely through the switching circuitry;

voice processing circuitry for automatically interacting with the call, wherein the switching circuitry and the voice processing circuitry are controlled by a single processing means;

circuitry for listening to a voice signal at one of the telephone extensions coupled to the system;

circuitry for activating a recording sequence to record the voice signal; and circuitry for storing the recorded voice signal in a digital memory.

29. A telephone call and voice processing system comprising:

switching circuitry for receiving a call, wherein ihe switching circuitry connects the call to a telecommunications device coupled to the system;

voice processing circuitry for automatically interacting with the call to direct the call to a voice mailbox if the device does not go off-hook to answer the call, wherein the switching circuitry and the voice processing circuitry are controlled by a single processing means; and circuitry for permitting a user of a telephone coupled to the system to monitor a voice mail message while the message is being recorded into the user's mailbox.

30. A telephone call and voice processing system comprising:

switching circuitry for receiving a call, wherein the switching circuitry connects the call to a telecommunications device coupled to the system; and voice processing circuitry for automatically interacting with the call, wherein the switching circuitry and the voice processing circuitry are controlled by a single processing means, wherein the voice processing circuitry further comprises a signal processing circuitry coupled to the single processing means, wherein the signal processing circuitry further includes:

a DTMF receiver operable for recognizing DTMF tones from the call and instructing the switching circuitry to connect the call to the telecommunications device identified by the DTMF tones, wherein the telecommunications device is one of a plurality of telephone extensions connected to the switching circuitry.

31. A telephone call and voice processing system comprising:

switching circuitry for receiving a call, wherein the switching circuitry connects the call to a telecommunications device coupled to the system;

voice processing circuitry for automatically interacting with the call, wherein the switching circuitry and the voice processing circuitry are controlled by a single processing means circuitry for listening to a voice signal at a telephone extension coupled to the system;

circuitry for activating a recording sequence to record the voice signal; and circuitry for storing the recorded voice signal in a digital memory, wherein the activating circuitry is tactically initiated by a user of the telephone extension, wherein the voice signal originated from a voice mail message stored in the system, wherein the call is an incoming call received by the switching circuitry via a central office trunk line, and wherein the switching circuitry connects the incoming call to one of a plurality of telecommunications devices coupled to the system as telephone extensions to the system.

32. A telephone call and voice processing system comprising:

a single microprocessor;

switching circuitry controlled by the single microprocessor;

a trunk line connected to the switching circuitry and adaptable for connecting to central office trunk circuitry;

a plurality of telephone extensions;

extension lines coupling the plurality of telephone extensions to the switching circuitry, wherein a call received by the switching circuitry over the trunk line is connected to one of the plurality of telephone extensions by the switching circuitry in response to information accompanying the call which identifies the one of the plurality of telephone extensions the call desires to be connected to; and voice processing circuitry for automatically interacting with the call including coupling the call to a voice mail box associated with the one of the telephone extensions.

33. A telephone call and voice processing system comprising:

switching circuitry for receiving a call, wherein the switching circuitry connects the call to one of a plurality of telecommunications devices coupled to the system in accordance with information accompanying the call that identifies the telecommunications device, wherein two or more of the plurality of telecommunications devices each further comprises both a speaker and a microphone for enabling a user to audibly communicate with the call; and voice processing circuitry for automatically interacting with the call, wherein the switching circuitry and the voice processing circuitry are controlled by not more than one microprocessor, wherein each of the two or more of the plurality of telecommunications devices are separately operable telephone extensions.

34. A telephone call and voice processing system comprising:

switching circuitry for receiving an incoming call from a source external to the telephone call and voice processing system, wherein the switching circuitry connects the incoming call to one of a plurality of telecommunications devices coupled to the telephone call and voice processing system as extensions to the telephone call and voice processing system; and voice processing circuitry for automatically interacting with the call to direct the call to a voice mailbox if a user of the telecommunications device does not answer the call, wherein the switching circuitry and the voice processing circuitry are controlled by a single microprocessor.

* * * * *

UNITED STATES PATENT AND TRADEMARK OFFICE
CERTIFICATE OF CORRECTION

PATENT NO. : 7,421,066 B1  Page 1 of 1
APPLICATION NO. : 09/805395
DATED : September 2, 2008
INVENTOR(S) : Harold E. A. Hansen, II It is certified that error appears in the above-identified patent and that said Letters Patent is hereby corrected as shown below:

Col. 20, Line 13
In claim 29, delete "ihe" and insert --the--.

Col. 20, Line 50
In claim 31, delete "means" and insert --means;--.

Signed and Sealed this

Sixteenth Day of December, 2008

JON W. DUDAS
*Director of the United States Patent and Trademark Office*